US011641345B2

(12) United States Patent
Hall et al.

(10) Patent No.: US 11,641,345 B2
(45) Date of Patent: May 2, 2023

(54) DISCOVERY FOR TOKEN SECURED ROUTING

(71) Applicant: Hall Labs LLC, Provo, UT (US)

(72) Inventors: David R. Hall, Provo, UT (US); Jeff Campbell, Spanish Fork, UT (US); Joshua Dutton, Provo, UT (US); Monte Johnson, Provo, UT (US); David Crismon, Herriman, UT (US)

(73) Assignee: Hall Labs LLC, Provo, UT (US)

(*) Notice: Subject to any disclaimer, the term of this patent is extended or adjusted under 35 U.S.C. 154(b) by 247 days.

(21) Appl. No.: 16/812,305

(22) Filed: Mar. 7, 2020

(65) Prior Publication Data

US 2021/0058312 A1    Feb. 25, 2021

Related U.S. Application Data

(60) Provisional application No. 62/888,780, filed on Aug. 19, 2019.

(51) Int. Cl.
*H04L 9/40* (2022.01)
*H04L 45/02* (2022.01)
*H04L 45/021* (2022.01)

(52) U.S. Cl.
CPC .......... *H04L 63/0407* (2013.01); *H04L 45/02* (2013.01); *H04L 45/021* (2013.01); *H04L 63/0428* (2013.01); *H04L 63/205* (2013.01)

(58) Field of Classification Search
CPC ... H04L 45/02; H04L 63/0407; H04L 63/205; H04L 63/0428; H04L 45/021; H04W 4/80; H04W 12/08; H04W 12/45; H04B 5/0031
See application file for complete search history.

(56) References Cited

U.S. PATENT DOCUMENTS

| | | | |
|---|---|---|---|
| 8,923,763 B2* | 12/2014 | O'Donoghue | H04W 4/80 455/41.1 |
| 2009/0154454 A1* | 6/2009 | Wittenschlaeger | H04L 45/02 370/389 |
| 2013/0074168 A1* | 3/2013 | Hao | H04L 9/3213 726/7 |
| 2014/0256252 A1* | 9/2014 | Geslin | H04B 5/0031 455/41.1 |
| 2016/0142109 A1* | 5/2016 | Kumar | H04W 4/80 455/41.1 |
| 2017/0373845 A1* | 12/2017 | Nix | H04L 9/3249 |
| 2018/0359811 A1* | 12/2018 | Verzun | H04W 28/12 |
| 2018/0367506 A1* | 12/2018 | Ford | H04W 12/06 |
| 2019/0274086 A1* | 9/2019 | Cui | H04W 40/28 |
| 2020/0012798 A1* | 1/2020 | Shankar | G06Q 20/0457 |

* cited by examiner

*Primary Examiner* — Oussama Roudani

(57) ABSTRACT

Systems and methods for token secured routing and discovery in token secured routing are disclosed. An inbound routing table is maintained. A communication link is established with a second node via a first port. A discovery packet is sent to the second node via the first port. A token is generated for communication with the second node. A first inbound routing entry is added to the inbound routing table, wherein the first inbound routing entry maps the first token state to the second node.

20 Claims, 24 Drawing Sheets

| Node 1 Outbound Routing Table 205 |||||||
|---|---|---|---|---|---|---|
| Public Token 210 | Protocol 215 | Source 220 | Dest 225 | Hierarchy 230 | Key 235 | index 240 | payload 245 |
| 0001 110-g | 1 | any | any | 0 | n/a | n/a | Network protocol |
| abca 110-a | 1 | any | Port0 | 1 | K1 | X1 | Payload |
| abcb 110-b | 1 | any | App1 | 2 | K2 | X2 | Payload |
| abcc 110-c | 1 | any | Port1 | 2 | K3 | X3 | Payload |
| abcd 110-d | 1 | internal | Port1 | 2 | K4 | X4 | Payload |

FIG. 2

| Node 2 Inbound Routing Table 305 ||||||||
|---|---|---|---|---|---|---|---|
| Public Token 210 | Protocol 215 | Source 220 | Dest 225 | Hierarchy 230 | Key 235 | index 240 | payload 245 |
| 0001 110-g | 1 | any | internal | 0 | n/a | n/a | Network protocol |
| abcc 110-c | 1 | Port0 | internal | 2 | K5 | X5 | Payload |
| abcd 110-d | 1 | Port0 | abce | 3 | K6 | X6 | Payload |

FIG. 3

Node 2 Outbound Routing Table 405

| Public Token 210 | Protocol 215 | Source 220 | Dest 225 | Hierarchy 230 | Key 235 | index 240 | payload 245 |
|---|---|---|---|---|---|---|---|
| 0001 110-g | 1 | 1 | internal | 0 | n/a | n/a | Network protocol |
| abce 110-e | 1 | Port0 | Port1 | 3 | K7 | X7 | Payload |
| abcf 110-f | 1 | any | Port0 | 2 | K8 | X8 | Payload |

FIG. 4

| B Inbound | | Permissions |
|---|---|---|
| $T_{AB}$ | B* | - |
| $T_{BC}$ | C* | - |
| $T_{BD}$ | D* | - |
| B Outbound | | |
| A* | $T_{AB}$ | - |
| $T_{AB}$ | Port1 | - |
| C* | $T_{BC}$ | - |
| $T_{BC}$ | Port2 | - |
| D* | $T_{BD}$ | |
| $T_{BD}$ | Port3 | |

FIG. 13

| B Inbound | | Permissions |
|---|---|---|
| $T_{AB}$ | $B^*$ | - |
| $T_S$ | $T_S$ | Forwarding |
| $T_{BD}$ | $D^*$ | - |
| B Outbound | | |
| $A^*$ | $T_{AB}$ | - |
| $T_{AB}$ | Port1 | - |
| $D^*$ | $T_{BD}$ | - |
| $T_{BD}$ | Port3 | - |
| $T_S$ | Port3 | - |

FIG. 16

DISCOVERY FOR TOKEN SECURED ROUTING

CROSS-REFERENCE TO RELATED APPLICATIONS §

This application claims the benefit of U.S. Provisional Application No. 62/888,780, filed Aug. 19, 2019, which is incorporated by reference herein in its entirety.

TECHNICAL FIELD

This application is related data transportation. In particular, this application is related to point-to-point data transportation.

BACKGROUND

There are countless situations where a network of different nodes (e.g., hardware nodes, software nodes, or a mix of hardware and software nodes may exchange data. Nodes may generate data and/or may consume data. One example of such a situation is a sensor network where different sensor nodes generate data (e.g., sensor data) and transport that data to a node that includes an application that processes the data and/or communicates the data to another device (a server via the internet, for example). In these situations, there is a need to transport data from one point to another point. Point to point data transportation, however, is complicated when the network of nodes is reconfigurable on the fly, when nodes discover connected neighboring nodes, and when nodes may communicate over diverse network subnets.

SUMMARY

In a first aspect, the disclosure provides a method for communication by a first node. The method includes maintaining an inbound routing table; establishing a communication link with a second node via a first port; sending a discovery packet to the second node via the first port, wherein the discovery packet comprises a token value, and wherein the token value comprises a platform token value; generating a token for communication with the second node, wherein the token has a first token value; identifying a first portion of the first token value, wherein the first portion of the first token value corresponds to a first token state of the token; and adding a first inbound routing entry to the inbound routing table, wherein the first inbound routing entry maps the first token state to the second node.

In a second aspect, the disclosure provides that the method further includes receiving a key exchange request from the second node; negotiating an encryption key with the second node; negotiating a session nonce with the second node; and negotiating a position offset with the second node, wherein the token is generated based on the session nonce and the position offset, and wherein the token is cryptographically secured using the encryption key.

In a third aspect, the disclosure provides that the method further includes maintaining an outbound routing table; adding a first outbound routing entry to the outbound routing table, wherein the first outbound routing entry maps the second node to the first token state; and adding a second outbound routing entry to the outbound routing table, wherein the second outbound routing entry maps the first token state to the first port.

In a fourth aspect, the disclosure provides that the method further includes obtaining a first message for the second node; identifying the first token state based on the first outbound routing entry; determining a first token value based on the first token state; identifying a first portion of the first token value; identifying a second portion of the first token value; encrypting the first message using the second portion of the first token value; generating a first packet comprising a first token and a first payload, wherein the first token is the first token state, and wherein the first payload is the encrypted first message; and sending the first packet to the second node based on the second outbound routing entry.

In a fifth aspect, the disclosure provides that the token comprises a deterministic random number, wherein the token has a plurality of token states, and wherein each token state corresponds to a disparate token value.

In a sixth aspect, the disclosure provides that the token state changes with each communication, wherein the token state ratchets with each communication according to a ratcheting algorithm.

In a seventh aspect, the disclosure provides that the method further includes establishing a secure channel with the second node using the token.

In an eighth aspect, the disclosure provides that the secure channel is maintained based at least in part on the token state of the first node being synchronized with the a token state of the second node.

In a ninth aspect, the disclosure provides that the method further includes generating a new token for each communication via the secure channel.

In a tenth aspect, the disclosure provides that the communication link is one of a hardware link or a wireless link.

In an eleventh aspect, the disclosure provides a method for communication by a first node. The method includes maintaining an inbound routing table; establishing a communication link with a second node via a first port; receiving a discovery packet from the second node via the first port, wherein the discovery packet comprises a token value, and wherein the token value comprises a platform token value; generating a token for communication with the second node, wherein the token has a first token value; identifying a first portion of the first token value, wherein the first portion of the first token value corresponds to a first token state of the token; and adding a first inbound routing entry to the inbound routing table, wherein the first inbound routing entry maps the first token state to the second node.

In a twelfth aspect, the disclosure provides that the method further includes sending a key exchange request from the second node; negotiating an encryption key with the second node; negotiating a session nonce with the second node; and negotiating a position offset with the second node, wherein the token is generated based on the session nonce and the position offset, and wherein the token is cryptographically secured using the encryption key.

In a thirteenth aspect, the disclosure provides that the method further includes maintaining an outbound routing table; adding a first outbound routing entry to the outbound routing table, wherein the first outbound routing entry maps the second node to the first token state; and adding a second outbound routing entry to the outbound routing table, wherein the second outbound routing entry maps the first token state to the first port.

In a fourteenth aspect, the disclosure provides that the method further includes obtaining a first message for the second node; identifying the first token state based on the first outbound routing entry; determining a first token value based on the first token state; identifying a first portion of the first token value; identifying a second portion of the first token value; encrypting the first message using the second portion of the first token value; generating a first packet comprising a first token and a first payload, wherein the first token is the first token state, and wherein the first payload is the encrypted first message; and sending the first packet to the second node based on the second outbound routing entry.

In a fifteenth aspect, the disclosure provides that the token comprises a deterministic random number, wherein the token has a plurality of token states, and wherein each token state corresponds to a disparate token value.

In a sixteenth aspect, the disclosure provides that the token state changes with each communication, wherein the token state ratchets with each communication according to a ratcheting algorithm.

In a seventeenth aspect, the disclosure provides that the method further includes establishing a secure channel with the second node using the token.

In an eighteenth aspect, the disclosure provides that the secure channel is maintained based at least in part on the token state of the first node being synchronized with the a token state of the second node.

In a nineteenth aspect, the disclosure provides that the method further includes generating a new token for each communication via the secure channel.

In a twentieth aspect, the disclosure provides that the communication link is one of a hardware link or a wireless link.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 2 is a table illustrating an exemplary outbound routing table for node 1.

FIG. 3 is a table illustrating an exemplary inbound routing table for node 2.

FIG. 4 is a table illustrating an exemplary outbound routing table for node 2.

FIG. 13 is a table illustrating the inbound and outbound routing tables for node B following the discovery process with node C and node D.

FIG. 16 is a table illustrating the inbound and outbound routing tables for node B following the establishment of a static route between node A and node D.

DETAILED DESCRIPTION

Figure 1:
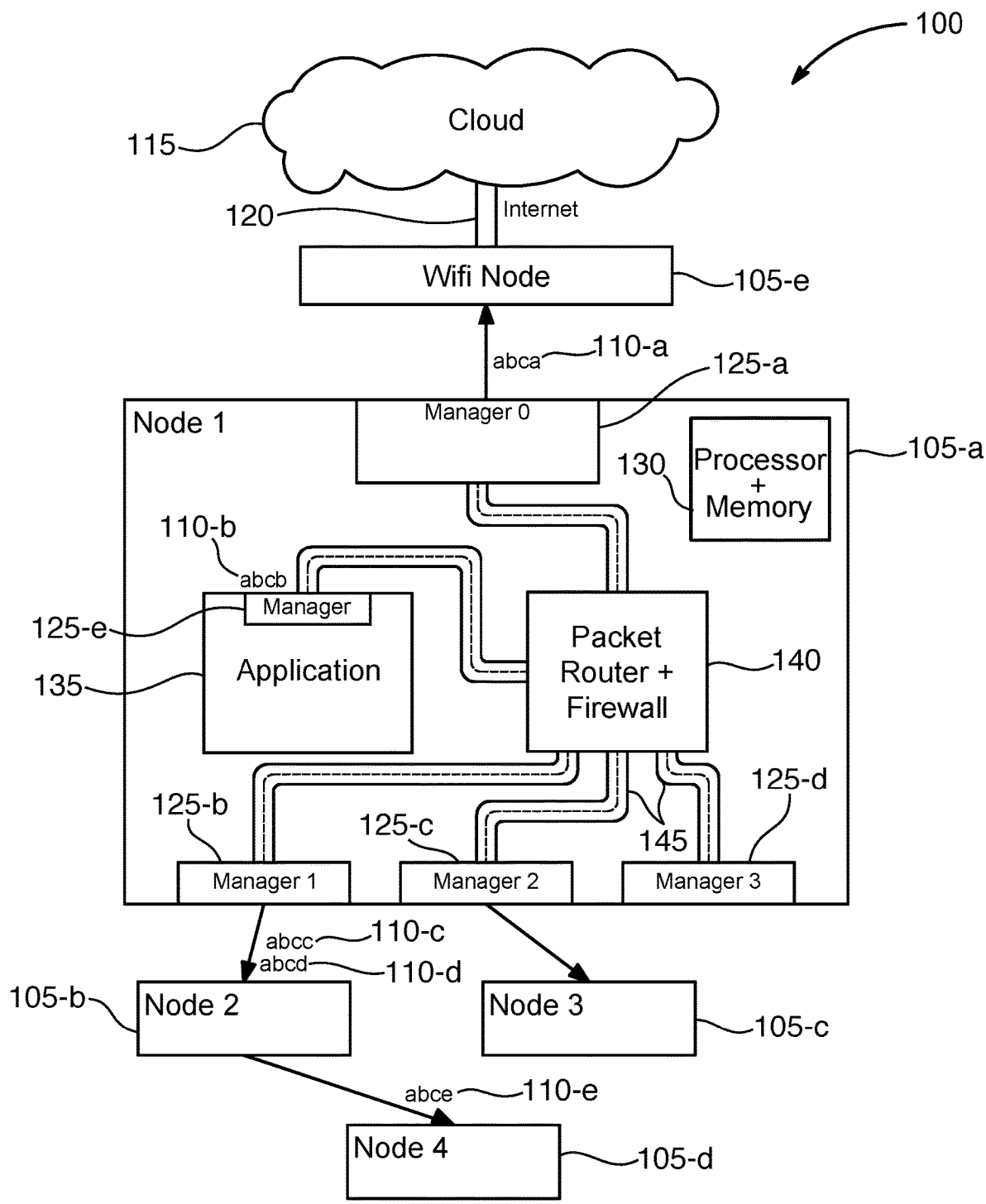
FIG. 1 is a block diagram illustrating an exemplary network in which the present systems and methods may be implemented.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "node" is meant to refer to a hardware device or a hardware enabled software application that may send and/or receive data via point to point communication.

There are many situations where it may be beneficial for leaf nodes to transport data in a network of distributed hardware and software device. For example, data may be generated and/or consumed by leaf nodes resulting in a need to transport data within the network of leaf nodes. For instance, a sensor network may include a variety of sensor nodes that generate and communicate data along with communication nodes, interface nodes, and or applications that consume or process the data.

It is appreciated that a network of nodes, particularly a network of nodes that is reconfigurable on the fly, where nodes discover connected neighbor nodes, and in which nodes may communicate over diverse subnets, presents a number of communication challenges. The present disclosure considers how to transport data from point to point in a network that is reconfigurable on the fly, with nodes that discover connected neighbor nodes, and with nodes that may communicate over diverse network subnets.

Routing and security are two key aspects to communications systems. Often routing and security are handled separately (with security being an optional additional layer to the routing function, for example). The described systems and methods integrate routing and security together to secure both the routing information and the payload information. This approach is described herein as "token secured routing."

Token secured routing is a protocol that integrates network routing and security into a unified paradigm. Token secured routing provides facilities for constructing and deconstructing network connections, facilities for identity verification, and facilities for information management. All of these facilities as well as other capabilities are created with security mechanisms integral to every step governing network traffic. Despite these capabilities, the network remains flexible and easy to use. For example, a user with proper credentials will not notice any change in performance but will observe greater control over their own data and privacy. While a user without proper credentials will be unable to traverse the network.

As discussed herein, token secured routing uses tokens, which define both the routing and the security model for a data packet. Tokens may be simple tokens or secured tokens. A simple token is a static fixed random number. In one embodiment, a secured token is a cryptographically secure random number. In another embodiment, a secured token is a deterministic ratcheting cryptographically secure random number. It is appreciated that the composition of the token may vary without departing from the scope of the described systems and methods.

In token secured routing, each point to point communication between two adjacent nodes is governed by a token protocol that is specific to only those two adjacent nodes. As a result, a new token (e.g., a token specific to the next two nodes) must be generated at each node for the next hop in the network (with the exception of non-secured messages, and/or static routes, for example). Because routing and security are both based on the token being used, both routing and security are enforced at each hop (e.g., step/node) in a communication route. This provides numerous features on both the routing side and the security side.

For example, on the routing side, these features include enabling flexible topologies, supporting multi-path, enabling a self-discoverable network, enabling an ad hoc network, enabling a self-healing network, enabling a supernet (built on top of the internet, for example), providing a flexible implementation that can be adapted to run at the link layer, the transport layer, or the application layer, using multiple tokens to create layered routes and permission structures, providing traceability, providing auditable route tracing, and preventing circular routing without a time to live (TTL) field.

For example, on the security side, these features include providing routing transport control, providing identity of origin authentication, providing identity of destination authentication, facilitating reputation based trust augmentation, providing node-to-node guaranteed encryption, providing per-packet authorization, providing data/connection owner identification, providing non-repudiation of delivery, providing non-repudiation of transmission, providing inherent blocking of unauthorized access, and providing per socket access control.

Referring now to the Figures, FIG. 1 is a block diagram illustrating an exemplary network 100 in which the present systems and methods may be implemented. The network 100 includes five nodes 105 (e.g., node 1—105-*a*, node 2—105-*b*, node 3—105-*c*, node 4—105-*c*, and Wi-Fi node 105-*e*). Node 1—105-*a* is connected (e.g., via a wired or wireless link) to node 2—105-*b*, node 3—105-*c*, and Wi-Fi node 105-*e*. Node 2—105-*b* is additionally connected to node 4—105-*d*. Wi-Fi node 105-*e* is additionally connected to the cloud 115 (e.g., a server in the cloud 115) via the internet 120.

Node 1—105-*a* is enlarged to illustrate an example of the internal structure/functions of a node 105. Node 1—105-*a* includes five input/output (e.g., port) managers 125 (manager 0—125-*a*, manager 1—125-*b*, manager 2—125-*c*, manager 3—125-*d*, and manager 125-*e* that is associated with the application 135), application 135, packet router and firewall 140, and interconnections 145 that interconnect each of these components together. Additionally, node 1—105-*a* includes a processor and memory 130, which executes instructions that are stored in the memory and enable the node (e.g., the packet router and firewall 140, the application 135, and/or the managers 125) to perform various functions (e.g., message processing). The packet router and firewall 140 manages internal communication within the node 105 by monitoring and routing packets via interconnections 145. Although application 135 is included within node 1—105-*a*, it is appreciated that it includes manager 125-*e* and may act as another node (e.g., a software node instead of a hardware node) with regard to data communication using the described systems and methods.

As shown, node 1—105-*a* is connected to Wi-Fi node 105-*e* via a channel secured via a first token "abca" 110-*a* (e.g., public token), is connected to the application 135 (via manager 125-*e*) via a channel secured via a second token "abcb" 110-*b*, is connected to node 2—105-*b* via a channel secured via a third token "abcc" 110-*c*, and is connected to node 4—105-*d* via a channel secured via a fourth token "abcd" 110-*d*.

The creation of a token secured channel results in the addition of one or more entries in an inbound routing table and/or an outbound routing table. In some embodiments, these inbound routing tables and/or outbound routing tables are managed by a packet router and firewall (e.g., packet router and firewall 140) within the node. Selected exemplary routing tables for network 100 are illustrated in FIGS. 2-4.

It is appreciated that Port3 (e.g., manager 3 125-*d*) has no routes, hence is unreachable. Additionally, traffic to Node 4 105-*d* is routed through Port1 (e.g., manager 1 125-*b*), but with a unique channel (i.e., "abcd").

FIG. 2 is a table 200 illustrating an exemplary outbound routing table 205 for node 1—105-*a* in network 100. The node 1 outbound routing table 205 includes a public token field 210, a protocol field 215, a source field 220, a destination field 225, a hierarchy field 230, a key field 235, an index field 240, and a payload type field 245. The node 1 outbound routing table 205 includes 5 entries corresponding to the public token 210 values of "0001" 110-*g*, "abca" 110-*a*, "abcb" 110-*b*, "abcc" 110-*c*, and "abcd" 110-*d*.

The public token 210 is a portion of a token value or other identifier for a token value. The public token is either a known static address (e.g., "0001") or a cryptographically secure one-time key (e.g., "abca"). The short token lengths used herein are for example only. The public token is typically included in the token portion of a packet that is transmitted across a secured channel and thus is public visible. The public token is not the actual token value, since transmitting the actual token value (e.g., the actual cryptographically secure key) would defeat the purpose of using a cryptographically secure one-time key (e.g., cryptographically secure random number).

The token protocol 215 specifies a routing and security model for the data packet. It is appreciated that different token protocols may be used to support additional functionality.

The source 220 and/or destination 225 define the actual routing rules. It is appreciated that the universe of available sources and/or destinations is limited to the sources and destinations that are known to the node. For example, ports available at the node, applications available at the node, registered public tokens that are currently known by the node (e.g., in the inbound routing table and/or the outbound routing table). General categorizations such as "any" or "internal" are also possible, as shown.

Hierarchy 230 identifies the order in which the entries should be evaluated (with lower numbered hierarchal rules being evaluated before higher numbered hierarchal rules, for example). Key 235 identifies the key (e.g., token value) being used for that secured connection. The index 240 identifies the token state (e.g., ratcheting state) of the token value. The payload 245 indicates the type of payload (e.g., network protocol or normal payload).

The public token "0001" 110-*g* entry is not cryptographically secured (e.g., the key 235 and index 245 fields are not applicable (n/a)) and the payload is a network protocol payload. The "abca" first token 110-*a* routes to (e.g., has a destination of) Port0 (i.e., via manager 0—125-*a*) which means that it will route to the Wi-Fi node 105-*e* via a secured channel using the appropriate key (K1) and index (X1). The "abcb" second token 110-*b* routes to (e.g., has a destination of) App1 (i.e., via manager —125-*e*) which means that it will route to the application 135 via a secured channel using the appropriate key (K2) and index (X2). The "abcc" third token 110-*c* routes to (e.g., has a destination of) Port1 (i.e., via manager 1—125-*b*) which means that it will route to node 2—105-*b* via a secured channel using the appropriate key (K3) and index (X3). The "abcd" fourth token 110-*d* routes to (e.g., has a destination of) Port1 (i.e., via manager 1—125-*b*) which means that it will route to node 2—105-*b* via a secured channel using the appropriate key (K4) and index (X4) (which are different than K3 and X3, for example).

FIG. 3 is a table 300 illustrating an exemplary inbound routing table 305 for node 2—105-*b* in network 100. The node 2 inbound routing table 305 includes the same field discussed in the node 1 outbound routing table 205. The node 2 inbound routing table 305 includes 3 entries corresponding to the public token 210 values of "0001" 110-*g*, "abcc" 110-*c*, and "abcd" 110-*d*.

The public token "0001" 110-*g* entry has a source of any and routes to "internal". The public token "0001" 110-*g* is not cryptographically secured (e.g., the key 235 and index 245 fields are not applicable (n/a)) and the payload is a network protocol payload. The "abcc" third token 110-*c*, which will be secured using key (K5) and index (X5), has a source of Port0 and routes to (e.g., has a destination of) "internal", which means that it will route to the internal processor and/or memory (e.g., processor and memory 130) of node 2—105-*b* via the internal packet routing (via a packet router and firewall, for example). The "abcd" fourth token 110-*d*, which will be secured using key (K6) and index (X6), has a source of Port0 and routes to (e.g., has a destination of) "abce", which is the fifth token and is the secure channel between node 2—105-*b* and node 4—105-*d*.

FIG. 4 is a table 400 illustrating an exemplary outbound routing table 405 for node 2—105-*b* in network 100. The node 2 outbound routing table 405 includes the same field discussed in the node 1 outbound routing table 205 and the node 2 inbound routing table 305. The node 2 outbound routing table 405 includes 3 entries corresponding to the public token 210 values of "0001" 110-*g*, "abce" 110-*e*, and "abcf" 110-*f*.

The public token "0001" 110-*g* entry is not cryptographically secured (e.g., the key 235 and index 245 fields are not applicable (n/a)) and the payload is a network protocol payload. The "abce" fifth token 110-*e* has a source of Port0 and routes to (e.g., has a destination of) Port1, which means that it will route to node 4—105-*d* via a secured channel using the appropriate key (K7) and index (X7). The "abcf" sixth token 110-*f* has a source of "any" and routes to (e.g., has a destination of) Port0, which means that it will route to node 1—105-*a* via a secured channel using the appropriate key (K8) and index (X8).

Thus, in network 100, in one example, node 1—105-*a* may wish to send a message to node 4—105-*d* using the fourth token "abcd" 110-*d*. Node 1—105-*a* (e.g., the packet router and firewall 140) references the node 1 outbound routing table 205 and identifies the entry associated with the fourth token "abcd" 110-*d* for the outbound routing instructions. According to the entry for "abcd" 110-*d* in the node 1 outbound routing table 205, the internal source routes to Port1, secured by key (K4) and index (X4). Node 1—110-*b* (e.g., packet router and firewall 140) may encrypt the message using key (K4) and index (X4) and may generate a packet that includes the fourth token "abcd" 110-*d* and the encrypted message. Packet router and firewall 140 routes the generated packet to manager 1—125 (e.g., Port1) based on the entry for "abcd" 110-*d* registered in the node 1 outbound routing table 205. Manager 1—125 may send the generated packet on Port1.

Continuing with this example, node 2—105-*b* receives the generated packet (referred to now as the received packet) at Port0 and passes the received packet to a packet router and firewall (e.g., packet router and firewall 140). Node 2—105-*b* (e.g., the packet router and firewall) checks the public token of the received packet and identifies that the public token is "abcd" 110-*d*. Node 2—105-*b* checks the node 2 inbound routing table 305 and identifies an inbound routing rule corresponding to the "abcd" 110-*d* token and processes the received packet accordingly. In this case, the packet is depacketized into token and encrypted message portions. The encrypted message is decrypted using the appropriate key (K5) and index (X5), which correspond to the key (K4) and index (X4) that was used to encrypt the message. Node 2—105-b routes message to the "abce" token.

Accordingly, node 2—105-b references the node 2 outbound routing table 405 and identifies an outbound routing rule corresponding to the "abce" 110-e token and processes the decrypted message accordingly. In this case, the decrypted message is encrypted using the appropriate key (K7) and index (X7) for the "abce" secured channel. Node 2—105-b generates a packet that includes the public token "abce" 110-e and the newly encrypted message. Packet router and firewall routes the generated packet to Port1 based on the entry for "abce" 110-e registered in the node 2 outbound routing table 405. The generated packet is sent on Port1. Using this described process node 4—105-d similarly receives and processes the packet generated by node 2—105-b.

Figure 5:
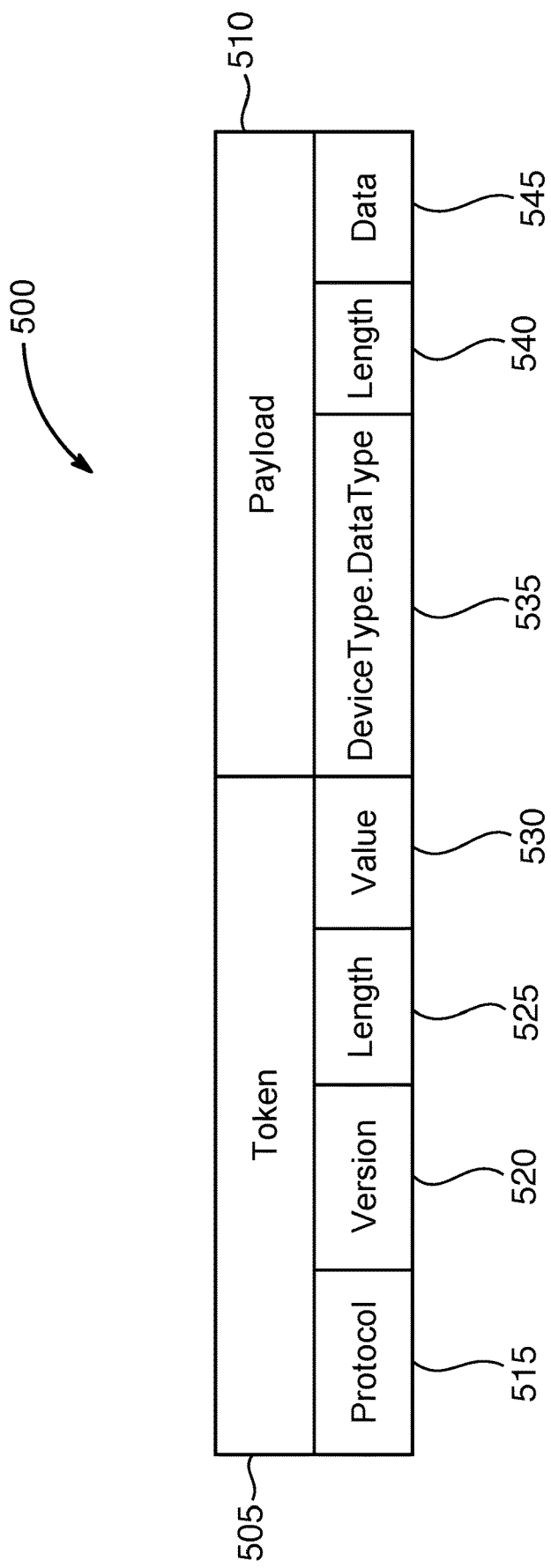
FIG. 5 is a block diagram illustrating one example of a packet.

FIG. 5 is a block diagram illustrating one example of a packet 500. The packet 500 includes a token portion 505 and a payload portion 510.

In some embodiments, the token portion 505 includes a token protocol 515, a token version 520, a length 525, and a value 530 (e.g., public token value). The token protocol 515 may specify a routing and security model for the data packet. The token protocol 515 may indicate a secure or insecure procedure, a specific routing destination, a generic nearest-neighbor destination, a network traversal search, or a broadcast mode. The token version 520 may provide compatibility information on the selected token protocol 515. The token length 525 may specify the number of bytes in the token value 530. The token value 530 (e.g., public token 110) provides routing and security information per the token protocol 515.

In some embodiments, the payload portion 510 includes a DeviceType.DataType 535, a data length 540, and data 545. The DeviceType.DataType 535 may specify the type, class, and/or formatting of the data 545. The data length 540 may specify the number bytes in the data 545. The data 545 may be the actual data payload.

Figure 6:
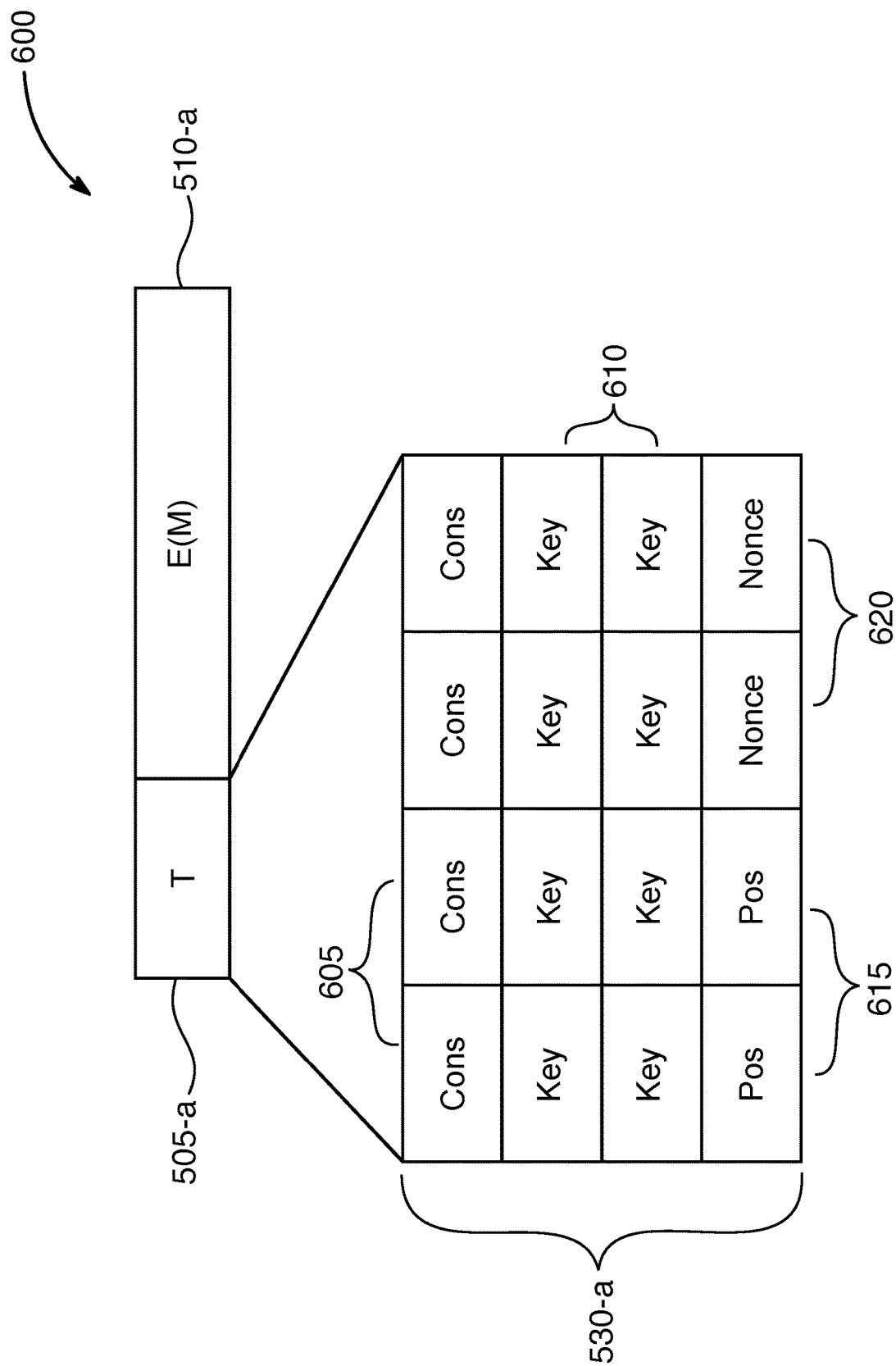
FIG. 6 is a block diagram illustrating another example of a packet.

FIG. 6 is a block diagram illustrating another example of a packet 600. The packet 600 includes a token portion 505-a and a payload portion 510-a. The token portion 505-a (e.g., T) may be an example of the token portion 505 illustrated in FIG. 5. Alternatively, the token portion 505-a may only include the token value 530. The payload portion 510-a (e.g., M) may be an example of the payload portion 510 illustrated in FIG. 5. Alternatively, the payload portion 510-a may only include the data 545.

In some embodiments, a stream cipher is used as pseudo random number generator to create a deterministic sequence of tokens. Examples of a stream cipher include the ChaCha20 and Salsa20 stream ciphers. The protocol can optionally use the same bit stream to provide data confidentiality. Fundamentally, token secured routing prefixes a message M, possibly encrypted by function E, with a token T that determines all network actions performed on the packet.

The token type of T determines the applied routing & security algorithms. Examples of tokens include simple tokens and secure tokens. It is appreciated that both simple tokens and secure tokens have their own use cases. In some embodiments, a simple token is a static fixed random number. In some embodiments, a secure token is a deterministic ratcheting cryptographically secure random number.

In one example, the token value 530-a may be a ChaCha20 state block that includes four (4) constant fields 605, eight (8) key fields 610 (e.g., key 235), two (2) position fields 615, and two (2) nonce fields 620.

Figure 7:
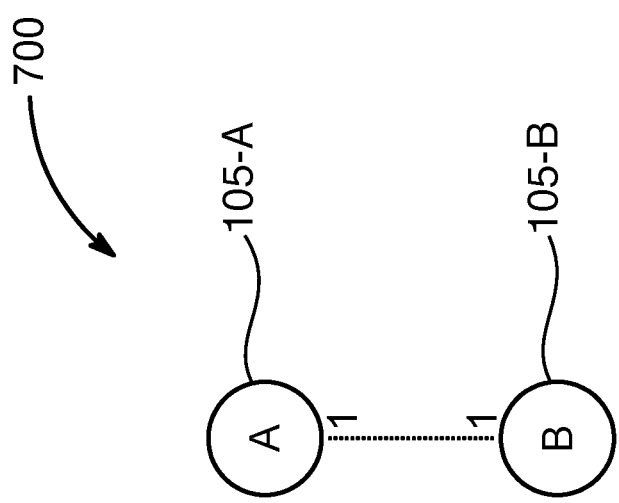
FIG. 7 is a block diagram illustrating a pair of nodes prior to discovery.
Figure 8:
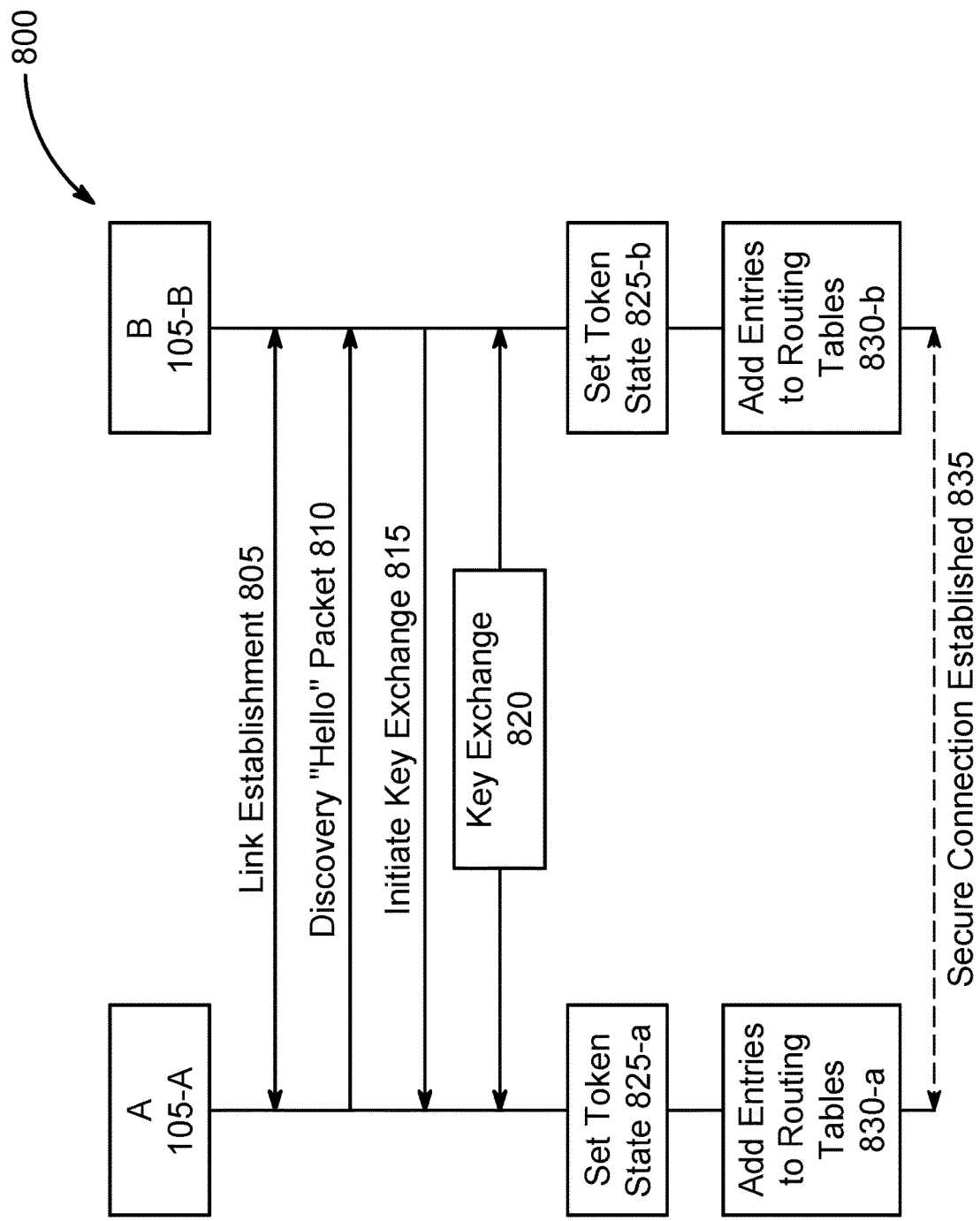
FIG. 8 is a message flow diagram of a discovery process between two nodes.
Figure 9:
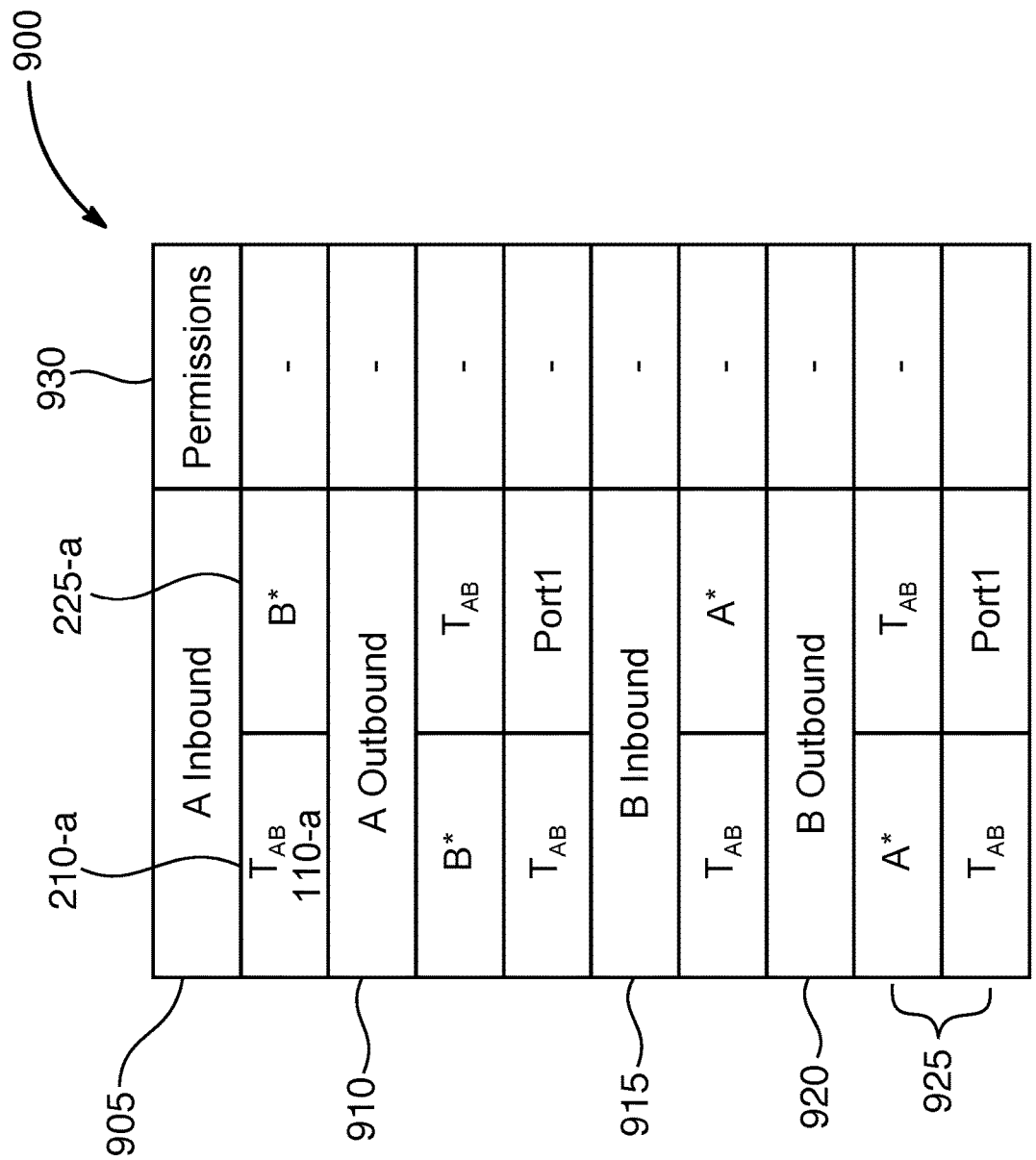
FIG. 9 is a table illustrating the respective inbound and outbound routing tables for node A and node B.

FIGS. 7-9 illustrate a discover process that enables two initially unconnected nodes (e.g., node A 105-A and node B 105-B) to establish a token secured route (e.g., a token secured channel) between them.

FIG. 7 is a block diagram 700 illustrating a pair of nodes prior to discovery. The pair of nodes includes node A 105-A and node B 105-B. Node A 105-A and node B 105-B are initially unconnected as illustrated by the dotted line. A node is not initially connected to any other node. By default, a node is unable to communicate with any node that is not its nearest neighbor. To communicate, the node goes through a 'Discovery' process. The discovery process is fundamentally between exactly two individual nodes (e.g., node A 105-A and node B 105-B).

FIG. 8 is a message flow diagram 800 of a discovery process between two nodes. Node A 105-A is initially unconnected to node B 105-B. A hardware link (e.g., wired link or wireless link) is established 805 between the two nodes. The link establishment 805 enables communication between the nodes (e.g., node A 105-A, node B 105-B). Node A 105-A sends a discovery "Hello" packet 810 to node B 105-B on port 1. The discovery "Hello" packet 810 may use a special platform token value (e.g., "0001"), such as a simple token (of length <2^64, for example). It is appreciated that there may be several different types of platform level packets. Including, for example, Hello\Knock packets, connection request packets, UUID disclosure packets, disclosure request packets, application advertisement packets, service advertisement packets, timestamp packets, heartbeat packets, and network error packets.

Node B 105-B, in response, sends an initiate key exchange request 815 to Node A 105-A. In response to the initiate key exchange request 815, node A 105-A and node B 105-B engage in a key exchange 820. For example, the key exchange 820 may be a Diffie-Hellman key exchange. In the key exchange 820, both node A 105-A and node B 105-B may obtain $k_{AB}$ (a 256-bit key (e.g., key 610), for example). In addition, in the key exchange 820, both node A 105-A and node B 105-B may obtain a position offset (a 32-bit position offset (e.g., position 615), for example). In addition, in the key exchange 820, both node A 105-A and node B 105-B may obtain a session nonce (a 64-bit session nonce (e.g., nonce 620), for example). The result of the key exchange 820 is a combined token state. As used herein, $T_{AB}$ represents the combined token state. Node A 105-A sets the token state 825-a to $T_{AB}$. Similarly, node B 105-B sets the token state 825-b to $T_{AB}$. With the token state set, both node A 105-A and node B 105-B add entries to the appropriate routing tables 830-a, 830-b. Exemplary routing tables are illustrated in FIG. 9. With the token state (e.g., $T_{AB}$) established and the appropriate entries added to the respective routing tables a secure connection (e.g., token secured connection) is established 835 between node A 105-A and node B 105-B.

FIG. 9 is a table 900 illustrating the respective inbound and outbound routing tables for node A 105-A and node B 105-B. Table 900 includes three columns, with the first column 210-a being the public token (e.g., public token 210, combined token state), the second column 225-a being the destination (e.g., destination 225), and the third column 930 being the permissions associated with the routing.

As a result of the discovery process, the following entries 925 are added to the routing tables 830. In the node A inbound routing table 905, a first entry routes the token state $T_{AB}$ to B* (e.g., a universally unique identifier (UUID) for node B 105-B). As used herein the asterisk (*) indicates a default or platform-level channel indicator. In the node A outbound routing table 910, a first entry routes B* to the token state $T_{AB}$, and a second entry routes $T_{AB}$ to Port1. In the node B inbound routing table 915, a first entry routes the token state $T_{AB}$ to A* (e.g., a UUID for node A 105-A). In the node B outbound routing table 920, a first entry routes A* to the token state $T_{AB}$, and a second entry routes $T_{AB}$ to Port1.

Figure 10:
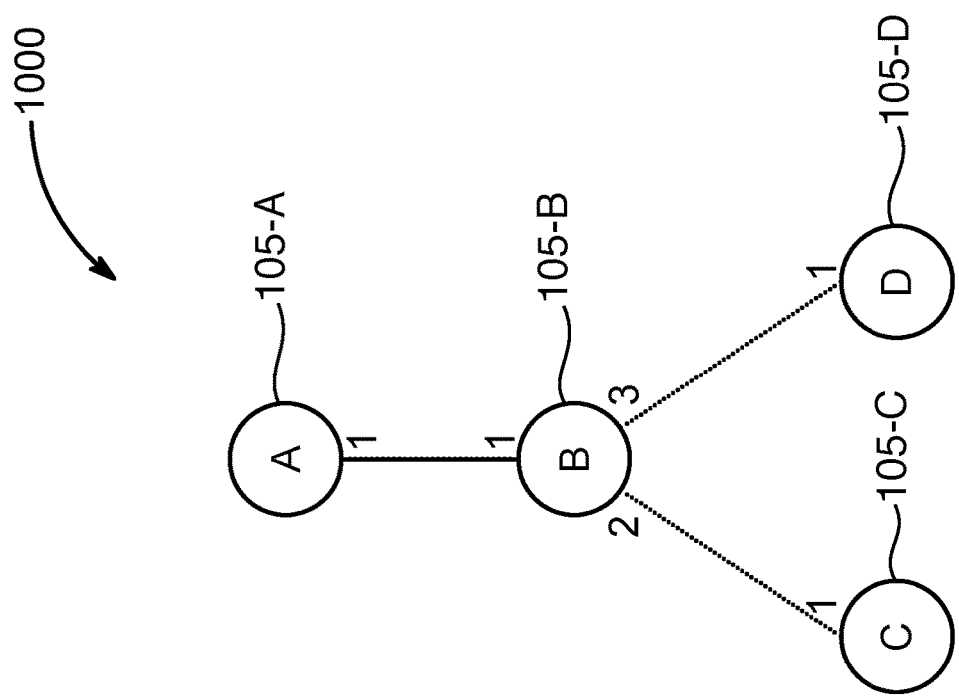
FIG. 10 is a block diagram illustrating a pair of connected nodes along with the addition of two additional nodes prior to discovery.

FIG. 10 is a block diagram 1000 illustrating a pair of connected nodes along with the addition of two additional nodes prior to discovery. Node A 105-A and node B 105-B are connected with a secure connection 835 as described in FIGS. 8 and 9. Node C 105-C and node D 105-D are not yet connected to node B 105-B.

Figure 11:
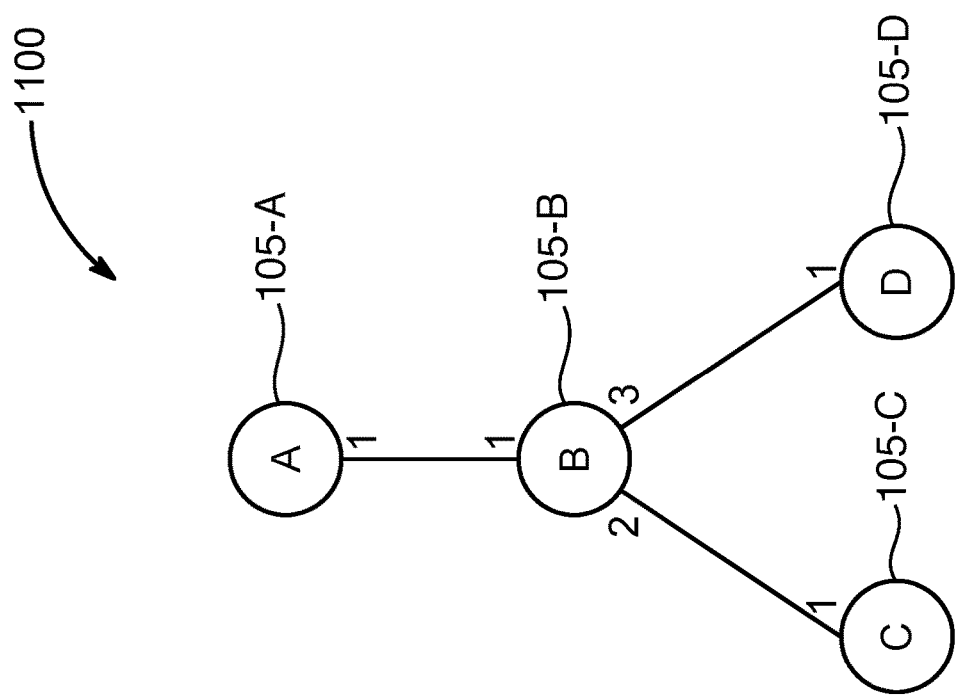
FIG. 11 is a block diagram illustrating a network of connected nodes with newly connected nodes node C and node D being connected to node B.

FIG. 11 is a block diagram 1100 illustrating a network of connected nodes with newly connected nodes node C 105-C and node D 105-D (compared to diagram 1000 in FIG. 10, for example) being connected to node B 105-B. When node B 105-B is connected to node C 105-C and node D 105-D, the same discovery procedure establishes $T_{BC}$ and $T_{BD}$. As a result of the addition of these new connections, the routing table for node B 105-B expands to include the new entries illustrated in FIG. 13.

Figure 12:
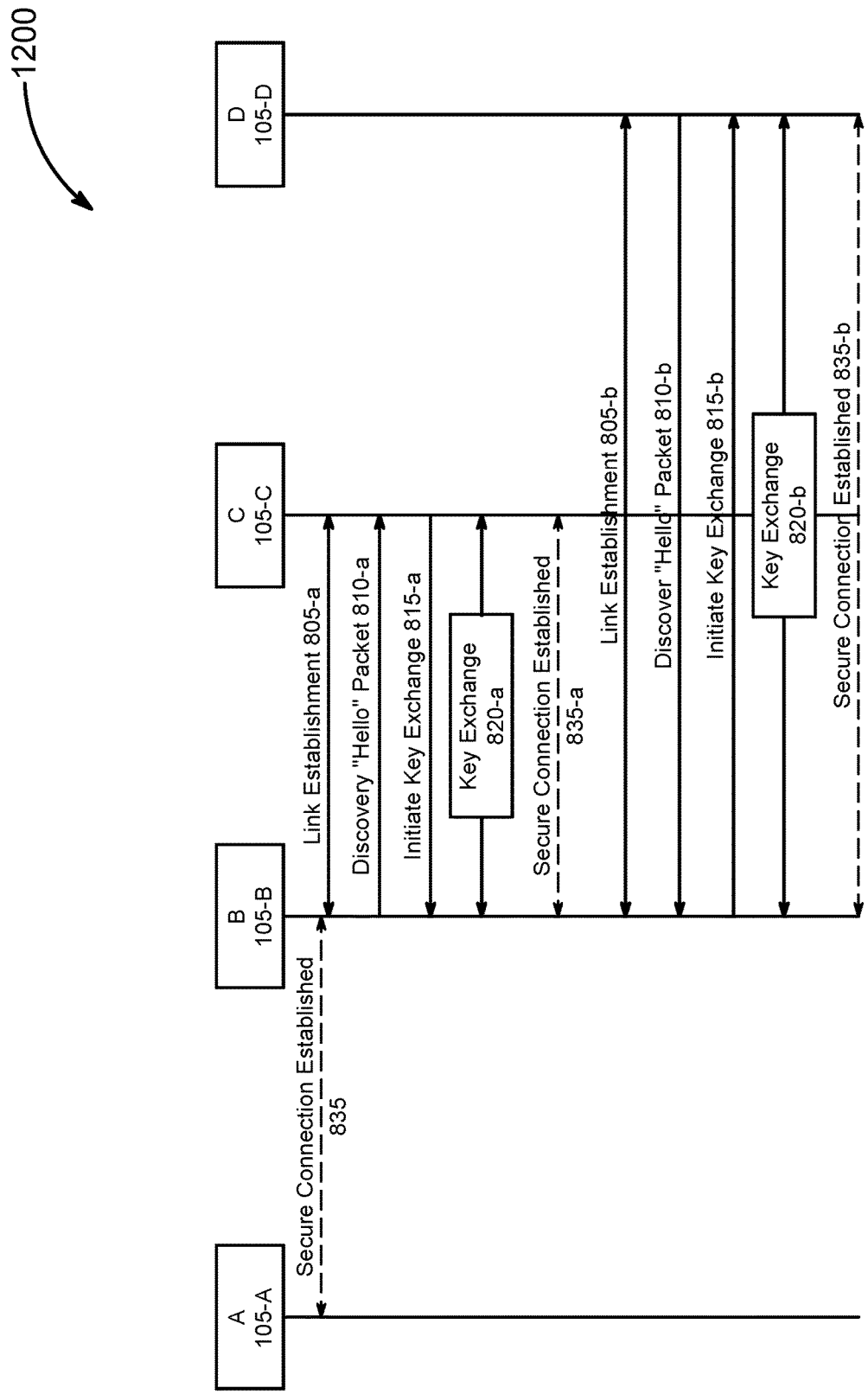
FIG. 12 is a message flow diagram of a discovery process between node B and newly added node C and node D.

FIG. 12 is a message flow diagram 1200 of a discovery process between node B 105-B and newly added node C 105-C and node D 105-D. As discussed with respect to FIG. 8, node A 105-A has a secure connection established 835 with node B 105-B.

Node B 105-B is initially unconnected to node C 105-C. A hardware link (e.g., wired link or wireless link) is established 805-a between the two nodes. The link establishment 805-a enables communication between the nodes (e.g., node B 105-B, node C 105-C). Node B 105-B sends a discovery "Hello" packet 810-a to node C 105-C on port 1. Node C 105-C, in response, sends an initiate key exchange request 815-a to Node B 105-B. In response to the initiate key exchange request 815-a, node B 105-B and node C 105-C engage in a key exchange 820-a (e.g., key exchange 820). The result of the key exchange 820 is a combined token state (e.g., $T_{BC}$). With the token state (e.g., $T_{BC}$) established and the appropriate entries added to the respective routing tables a secure connection (e.g., token secured connection) is established 835-a between node B 105-B and node C 105-C.

Node B 105-B is initially unconnected to node D 105-D. A hardware link (e.g., wired link or wireless link) is established 805-b between the two nodes. The link establishment 805-b enables communication between the nodes (e.g., node B 105-B, node D 105-D). Node D 105-D sends a discovery "Hello" packet 810-b to node B 105-B on port 1. Node B 105-B, in response, sends an initiate key exchange request 815-B to Node D 105-D. In response to the initiate key exchange request 815-b, node B 105-B and node D 105-D engage in a key exchange 820-b (e.g., key exchange 820). The result of the key exchange 820-b is a combined token state (e.g., $T_{BD}$). With the token state (e.g., $T_{BD}$) established and the appropriate entries added to the respective routing tables a secure connection (e.g., token secured connection) is established 835-b between node B 105-B and node D 105-D.

FIG. 13 is a table 1300 illustrating the inbound and outbound routing tables for node B 105-B following the discovery process with node C 105-C and node D 105-D. Table 1300 is an expanded version of the B inbound routing table 915 and B outbound routing table 920 illustrated in FIG. 9.

As a result of the discovery process, the following entries 925 are added to the routing tables 830. In the node B inbound routing table 915-a, the first entry (as discussed with respect to table 900, for example) routes the token state $T_{AB}$ to A* (e.g., a UUID for node A 105-A), a second entry routes the token state $T_{BC}$ to C* (e.g., a UUID for node C 105-C), and a third entry routes the token state $T_{BD}$ to D* (e.g., a UUID for node D 105-D). In the node B outbound routing table 920-a, the first entry (as discussed with respect to table 900, for example) routes A* to the token state $T_{AB}$, the second entry (as discussed with respect to table 900, for example) routes $T_{AB}$ to Port1, a third entry routes C* to the token state $T_{BC}$, a fourth entry routes $T_{BC}$ to Port2, a fifth entry routes D* to the token state $T_{BD}$, and a sixth entry routes $T_{BD}$ to Port3.

Referring back to FIG. 11, if node A 105-A wants to send a "hello" packet to a node that is not a nearest neighbor (e.g., node C 105-C, node D 105-D), it will use the pre-established channel with node B 105-B.

Figure 14:
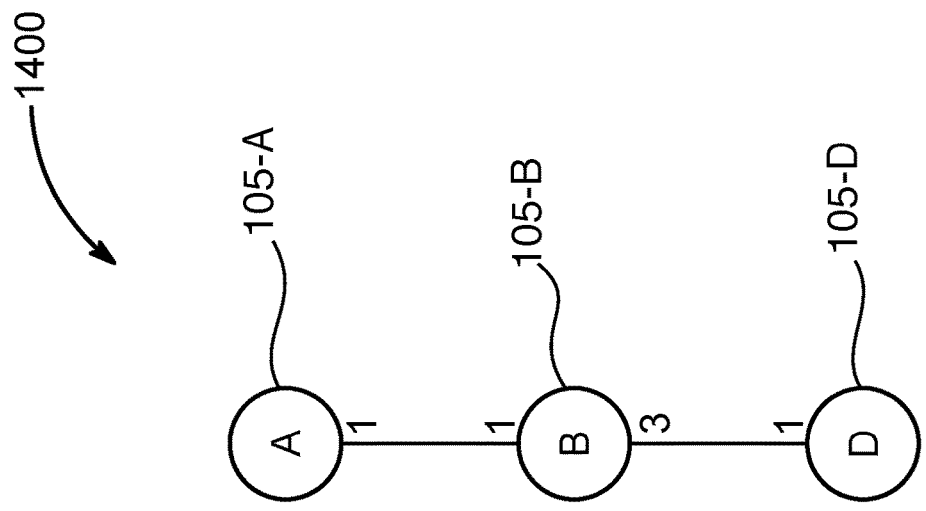
FIG. 14 is a block diagram illustrating a network of connected nodes in which static routes may be used to connect non-nearest neighbor nodes.

FIG. 14 is a block diagram 1400 illustrating a network of connected nodes in which static routes may be used to connect non-nearest neighbor nodes (e.g., node A 105-A to node D 105-D via intervening node B 105-B). If, for example, node A 105-A wants to establish a static route to node D 105-D, a static token $T_S$ is registered with each node (e.g., node B 105-B) in the route. A static token is a token protocol with a fixed value that does not change for the life of the route.

Figure 15:
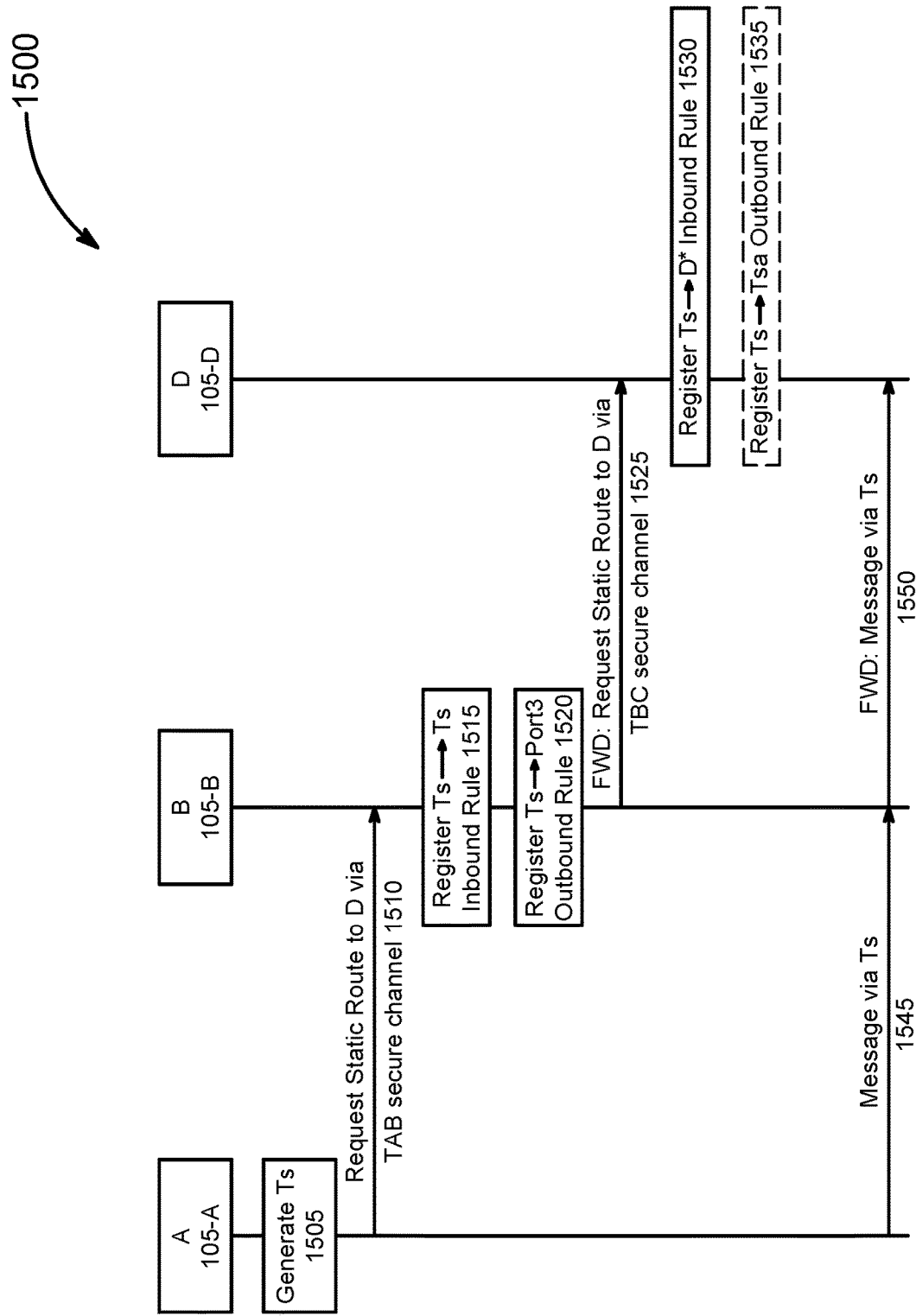
FIG. 15 is a message flow diagram illustrating how a static route may be used to connect two non-nearest neighbor nodes through an intervening node.

FIG. 15 is a message flow diagram 1500 illustrating how a static route may be used to connect two non-nearest neighbor nodes through an intervening node. It is assumed that node A 105-A and node B 105-B are connected with a secure channel and that node B 105-B and node D 105-D are connected with a secure channel as discussed with respect to FIGS. 11-13.

Node A 105-A, which wants to establish a static route to node D 105-D (i.e., a non-nearest node neighbor) generates a static token ($T_S$) 1505. With the static token generated, node A 105-A sends a request static route to D 1510 to node B 105-B via the secure channel established 835 between node A 105-A and node B 105-B. In other words, the request static route to D 1510 is sent using the $T_{AB}$ token state. The request static route to D 1510 includes the generated $T_S$. Node B 105-B uses the node B inbound routing table to route the request static route to D 1510 and processes the request. As part of the processing, node B 105-B registers an inbound routing rule that routes $T_S$ to $T_S$ 1515 (with a permission of "forwarding", for example). Since node B 105-B is not node D 105-D (i.e., the node being requested) node B 105-B may check to see if node D 105-D is referenced in the node B outbound routing table or may simply forward the request on all potential ports. Node B 105-B registers an outbound routing rule that routes $T_S$ to each potential port that Node B 105-B determines should be tried. In this case, node B 105-B registers an outbound routing rule that routes $T_S$ to Port3 1520.

Node B 105-B forwards the request static route to D 1525 to node B 105-B via the secure channel established 835 between node B 105-B and node D 105-D. In other words, the forwarded request static route to D 1525 is sent using the $T_{BD}$ token state. The forwarded request static route to D 1525 includes the generated $T_S$. Node D 105-D uses the node D inbound routing table to route the forwarded request static route to D 1510 and processes the request. Since node D 105-D is D (e.g., UUID for node D 105-D), node D 105-D accepts the static route request to D and registers an inbound routing rule that routes $T_S$ to D* 1530. Assuming that $T_{SA}$ represents a static route back from node D 105-D to node A 105-A, node D 105-D may also register an outbound routing rule that routes $T_S$ to $T_{SA}$ 1535.

With D accepting the static route request to D, a one-way static route is established between node A 105-A and node D 105-D. Accordingly, node A 105-A may send a message 1545 to node B 105-B via $T_S$. Since node B 105-B has the $T_S$ to $T_S$ inbound routing rule and the $T_S$ to Port3 outbound routing rule in place, node B 105-B forwards the message 1550 to node D 105-D via $T_S$ using these routing rules. Accordingly, a static route is created between node A 105-A and node D 105-D. It is appreciated that node D 105-D cannot send messages to node A 105-A using $T_S$ unless appropriate routing rules are similarly registered for the reverse path. It is also appreciated that static routes alone do not provide secure routing. Secure routing with static routes is still available, however, using the techniques discussed in FIGS. 18 and 19.

Figure 16:
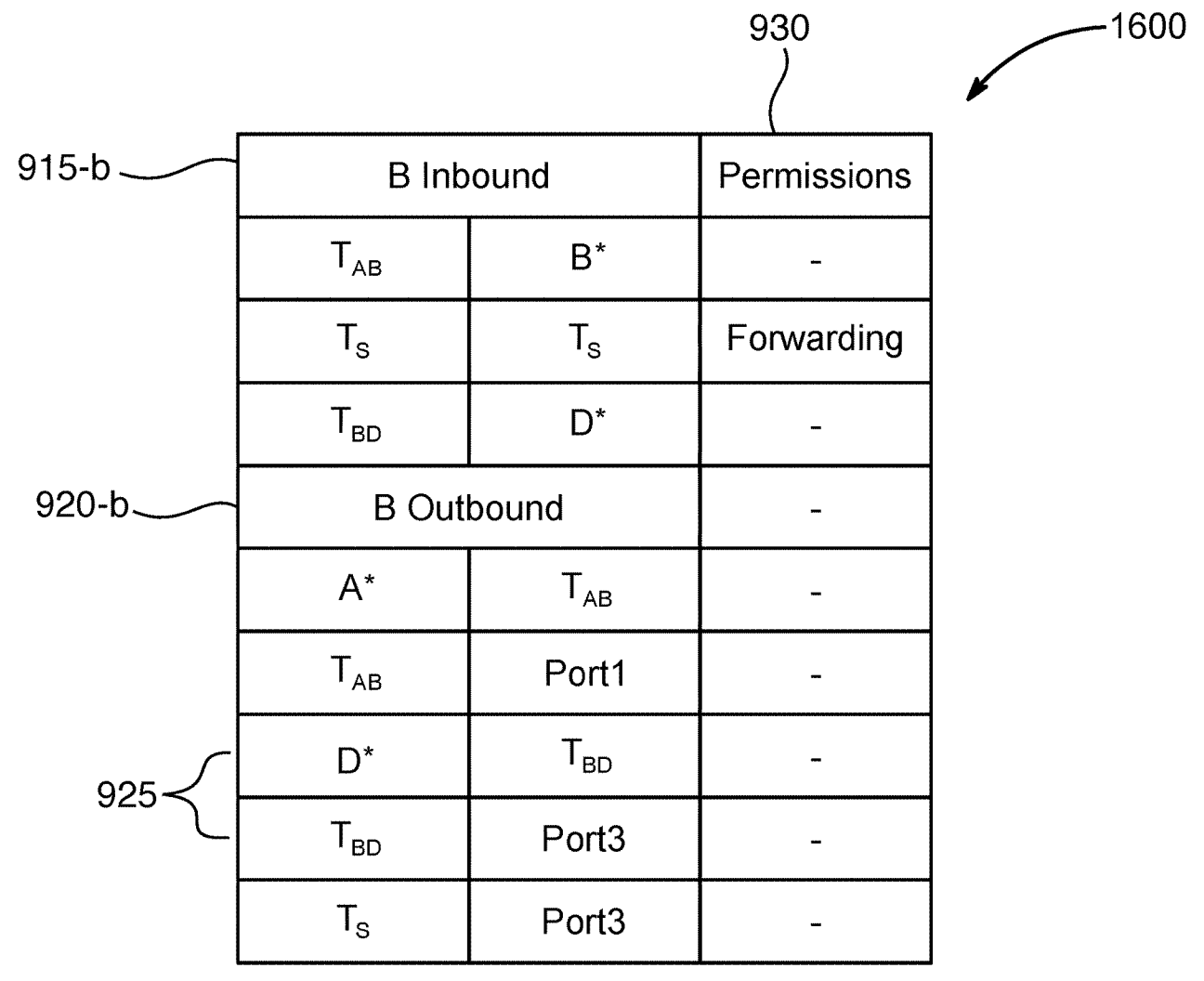

FIG. 16 is a table 1600 illustrating the inbound and outbound routing tables for node B 105-B following the establishment of a static route between node A 105-A and node D 105-D. Table 1600 is an expanded version of the B inbound routing table 915-a and B outbound routing table 920-a illustrated in FIG. 13 except that the entries related to node C 105-C are removed because node C 105-C is not included in the network topology 1400 illustrated in FIG. 14.

As a result of the static route establishment process, the following entries 925 are added to the routing tables 830. In the node B inbound routing table 915-b, the first entry (as discussed with respect to table 900, for example) routes the token state $T_{AB}$ to A* (e.g., a UUID for node A 105-A), a second entry routes the token state $T_S$ to $T_S$ (which includes the forwarding permission 930, for example), and a third entry routes the token state $T_{BD}$ to D* (e.g., a UUID for node D 105-D). In the node B outbound routing table 920-a, the first entry (as discussed with respect to table 900, for example) routes A* to the token state $T_{AB}$, the second entry (as discussed with respect to table 900, for example) routes $T_{AB}$ to Port1, a third entry routes D* to the token state $T_{BD}$, a fourth entry routes $T_{BD}$ to Port3, and a fifth entry routes $T_S$ to Port3.

Figure 17:
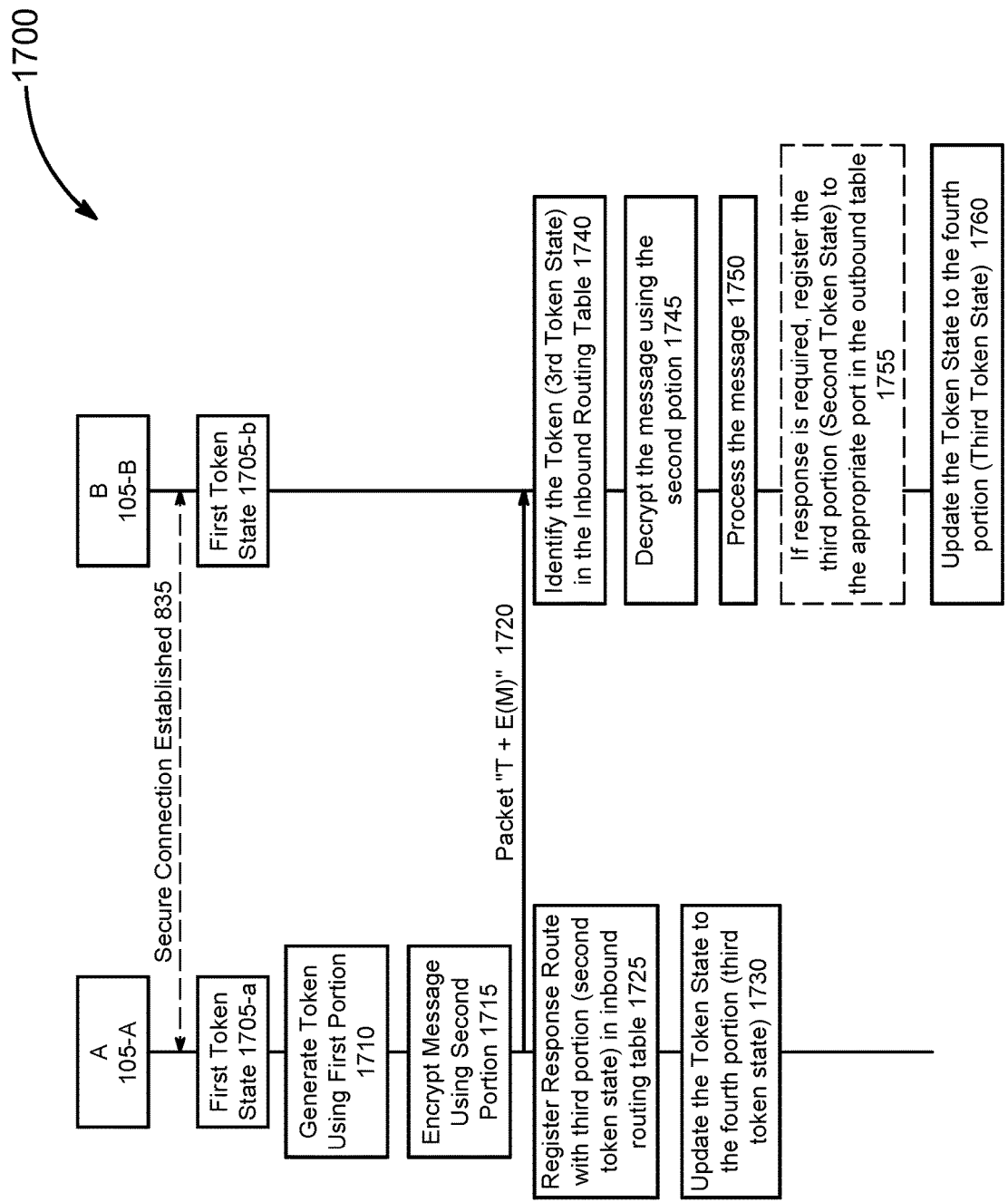
FIG. 17 is a message flow diagram that illustrates an exemplary process of how a token is used to provide token secured routing between two nodes

FIG. 17 is a message flow diagram 1700 that illustrates an exemplary process of how a token is used to provide token secured routing between two nodes (e.g., node A 105-A and node B 105-B). It is appreciated that a secured token may never be used to in same secured channel twice. Bits used to secure any use of the stream cipher on a channel results in the cipher index advancing.

A secure channel is established 835 between node A 105-A and node B 105-B. As a result of the secure connection being established 835, both node A 105-A and node B 105-B are synchronized in using the first token state 1705-a, 1705-b.

In one example, a program P in node A 105-A sends a message M to node B 105-B over channel $T_{AB}$, with a token/message length of 4/8 bytes. In this example, the current token state produces the following random bit string "ABCDEFGHIJKLMNOPQRSTUVWXYZ . . . " (e.g., token value). Accordingly, both node A 105-A and node B 105-B have "ABCD" set as the first token state 1705-a, 1705-b (e.g., $T_{AB}$="ABCD"). So, node B 105-B is expecting that the first token state (e.g., $T_{AB}$) is "ABCD". Node A 105-A generates a token (e.g., T for T+E(M)) using a first portion (i.e., "ABCD") of the token value 1710. Node A 105-A encrypts the message M using a second portion (i.e., "EFGHIJKL") of the token value 1715. With the token T and message M encrypted, node A may generate a packet of the form T+E(M). Node A 105-A may send the generated packet "T+E(M)" 1720 to node B 105-B using the appropriate outbound routing entries as described herein.

In connection with sending the generated packet, node A 105-A may register a response route with a third portion (i.e., "MNOP") (corresponding to a second token state of $T_{AB}$, for example) in the inbound routing table 1725 (e.g., "MNOP" routes to P). In addition, node A 105-A updates the token state (e.g., $T_{AB}$) to the fourth portion (i.e., "QRSTUVWXYZ . . . ") 1730 (corresponding to a third token state of $T_{AB}$, for example).

Node B 105-B receives the packet "T+E(M)" 1720 and identifies the token "ABCD", (i.e., the first token state associated with $T_{AB}$), which exists in the node B inbound routing table 1740. Thus, the token state for node B's $T_{AB}$ is exactly that of node A prior to the sending to the packet. Node B 105-B identifies the second portion of the token value (i.e., "EFGHIJKL") and decrypts the message using the second portion of the token value 1745. Node B 105-B then processes the message M 1750. For example, node B 105-B evaluates the message M and takes the appropriate responsive action based on the content of the message M.

Optionally, if a response is required to the message M, node B 105-B registers the third portion (i.e., "MNOP") of the token value (corresponding to the second token state of $T_{AB}$, for example) to the appropriate port in the node B outbound routing table 1755. In addition, node B 105-B updates the token state (e.g., $T_{AB}$) to the fourth portion (i.e., "QRSTUVWXYZ . . . ") 1760 (corresponding to a third token state of $T_{AB}$, for example). Thus, at this point, the token states of both node A 105-A and node B 105-B are again the same. It is appreciated that a response route is registered to allow node B 105-B to respond using a token state (e.g., the second token state of $T_{AB}$, in this example) that is "tied" to the previously sent message, which enables easy route traceability. In some cases, these return response routes may be removed from the inbound routing table of node A 105-A after a particular time frame. With the token state again being synchronized between node A 105-A and node B 105-B, each further communication between node A 105-A and node B 105-B may follow this same process (e.g., message flow 1700).

It is appreciated that external nodes connected to the ports of a transmitting node may communicate with the node or may ignore the communication requests. Each node maintains an access table that provides a lookup mechanism for each authorized data route (via the packet routing and firewall 140, for example). Each token, or a range of tokens, may be associated in the table (via the permissions field 930, for example) with one of the following actions: DROP, REJECT, FORWARD, or PROCESS.

If the action is DROP, the packet is discarded. If the action is REJECT, the packet is discarded and an error response is sent (e.g., returned via the registered return path to the sending node). If the action is FORWARD, the packet is routed to a destination node as defined in the access tables (e.g., inbound routing tables, outbound routing tables). If the action is PROCESS, the routing table or the payload of the packet is inspected for additional internal operations.

In some cases, the payload may request a data or service that is not supported by the node. In this case, the node may elect to subsequently forward the payload to another destination based on internal routing criteria or may DROP or REJECT the packet.

It is appreciated that the public token is either a known static address or a cryptographically secure one-time key. It is understood that the short token lengths discussed herein are exemplary only (for ease of understanding, for example) and actual lengths may be set to maximize certain token attributes (depending on use case, for example).

In some embodiments, the payload may be correlated with the token protocol. For example, protocol 01 may indicate generic platform level network operations such as destination discovery protocols. The payload provides additional inputs to the network functions, or response data. In another example, protocol 16-31 may indicate that the payload is an ipv4, ipv6, or other externally defined network protocol. In this implementation the payload is forwarded from on node to another in the direction of a gateway configured to process the external protocol. In another example, protocol 128-254 may each specify a particular cryptographic schema for generating and managing a public token. In another example, protocol 255 may be reserved for purposes of future extensibility.

Figure 18:
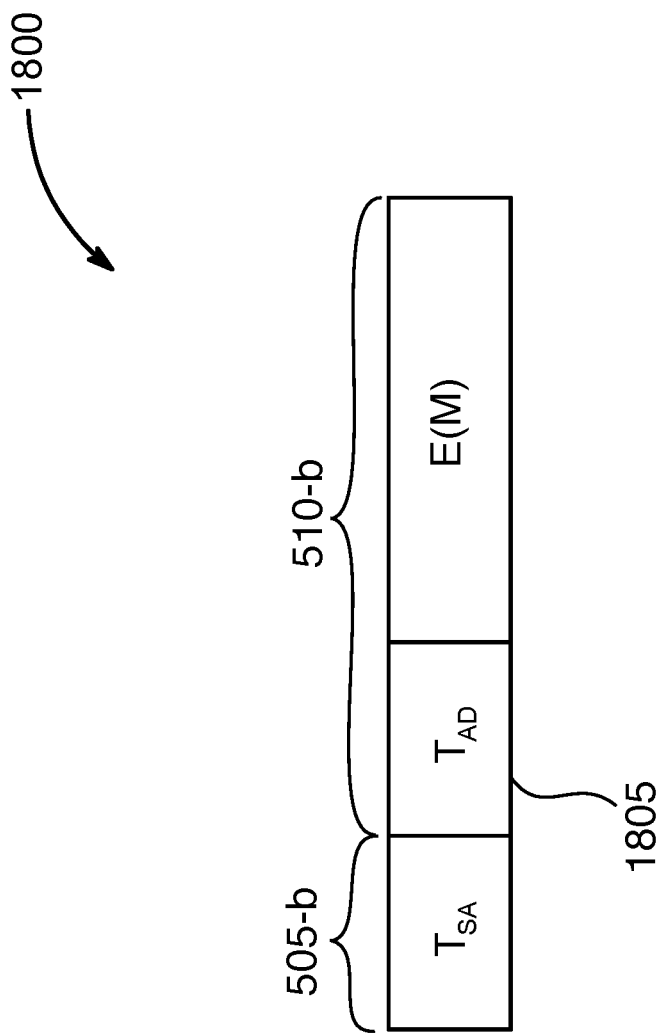
FIG. 18 is a block diagram of a packet that illustrates how secured routing may be implemented over a static route between node A and node D.

FIG. 18 is a block diagram 1800 of a packet that illustrates how secured routing may be implemented over a static route between node A 105-A and node D 105-D. The static route $T_S$ from node A 105-A to node D 105-D as considered with respect to FIGS. 14-16 may be designated as $T_{SA}$ whereas the static route $T_S$ from node D 105-D to node A 105-A as considered with respect to FIGS. 14-16 may be designated as $T_{SD}$.

In the prior examples, the progress of a message M from A→B→D required an initialized secure token at every hop in the network. In some applications, it may suffice to secure only the endpoints, namely A and D, with secure tokens. In this case, B (and all other intermediate nodes) may use a static route (e.g., $T_{SA}$ and $T_{SD}$). In these embodiments, once a static route has been established, the two end nodes (e.g., node A 105-A and node D 105-D) may similarly form a secure connection between them by performing the discover process described herein while messaging across the static route. In this case, a secured channel with a unique token state $T_{AD}$ 1805 is established between node A 105-A and node D 105-D.

As illustrated, the static route may occupy the token portion 505-b of the packet while the token state $T_{AD}$ between the endpoints node A 105-A and node D 105-D may be included in the payload portion 510-b of the packet. Accordingly, the features of token secured routing may be applied in connection with the use of static routes.

Figure 19:
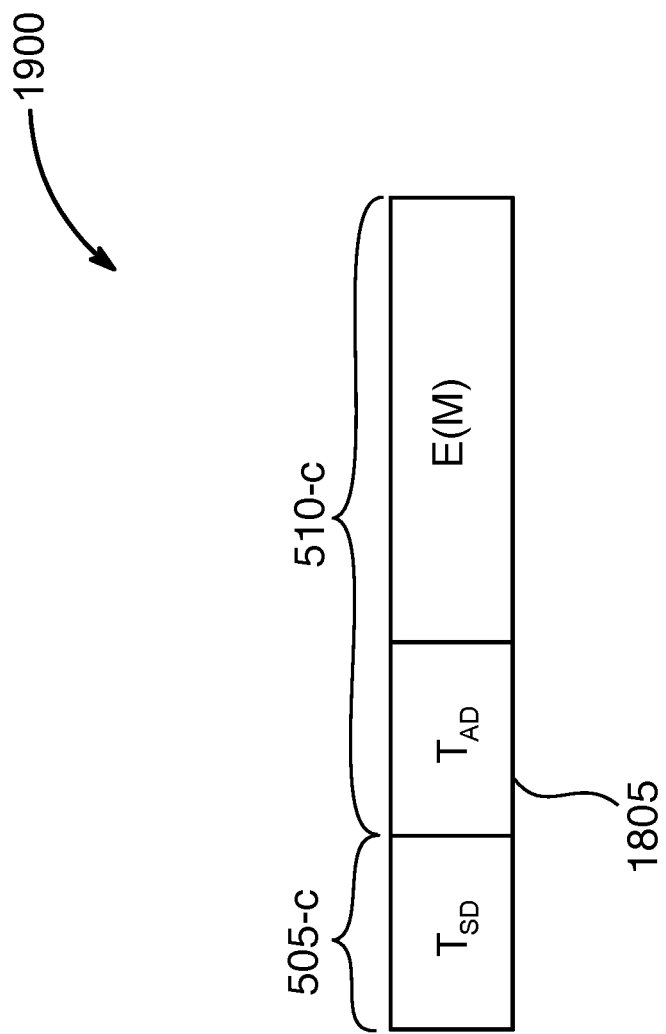
FIG. 19 is a block diagram of a packet that illustrates how secured routing may be implemented over a static route between node D and node A.

FIG. 19 is a block diagram 1900 of a packet that illustrates how secured routing may be implemented over a static route between node D 105-D and node A 105-A. It is noted that the same token state $T_{AD}$ 1805 for the secure connection established between node A 105-A and node D 105-D is included in both the $T_{SA}$ packet and the $T_{SD}$ packets. Similar to FIG. 18, the static token $T_{SD}$ is included in the token portion 505-c of the packet while the token state $T_{AD}$ for the secure connection between node A 105-A and node D 105-D is included in the payload portion 510-c of the packet.

Figure 20:
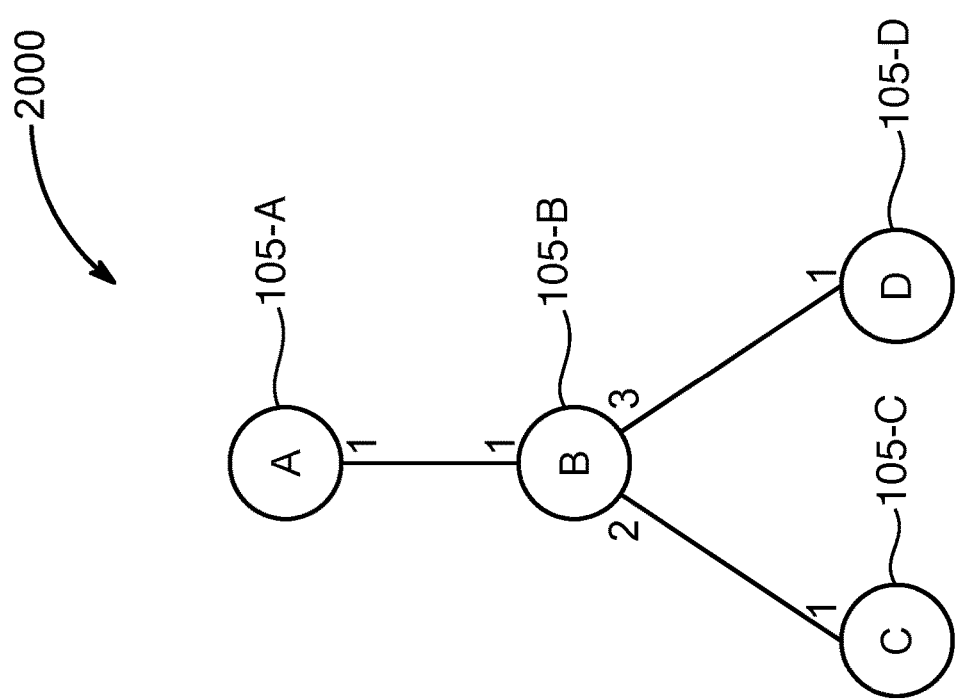
FIG. 20 is a block diagram illustrating an exemplary network of nodes that utilize the systems and methods described herein.

FIG. 20 is a block diagram 2000 illustrating an exemplary network of nodes that utilize the systems and methods described herein. Node A 105-A and node B 105-B are connected with a secure connection 835 as described in FIGS. 8 and 9. Node B 105-B is connected to node C 105-C and node D 105-D as described with respect to FIGS. 11 and 12. The message flow diagram illustrated in FIG. 21 is based on the network topology illustrated in FIG. 20.

Figure 21:
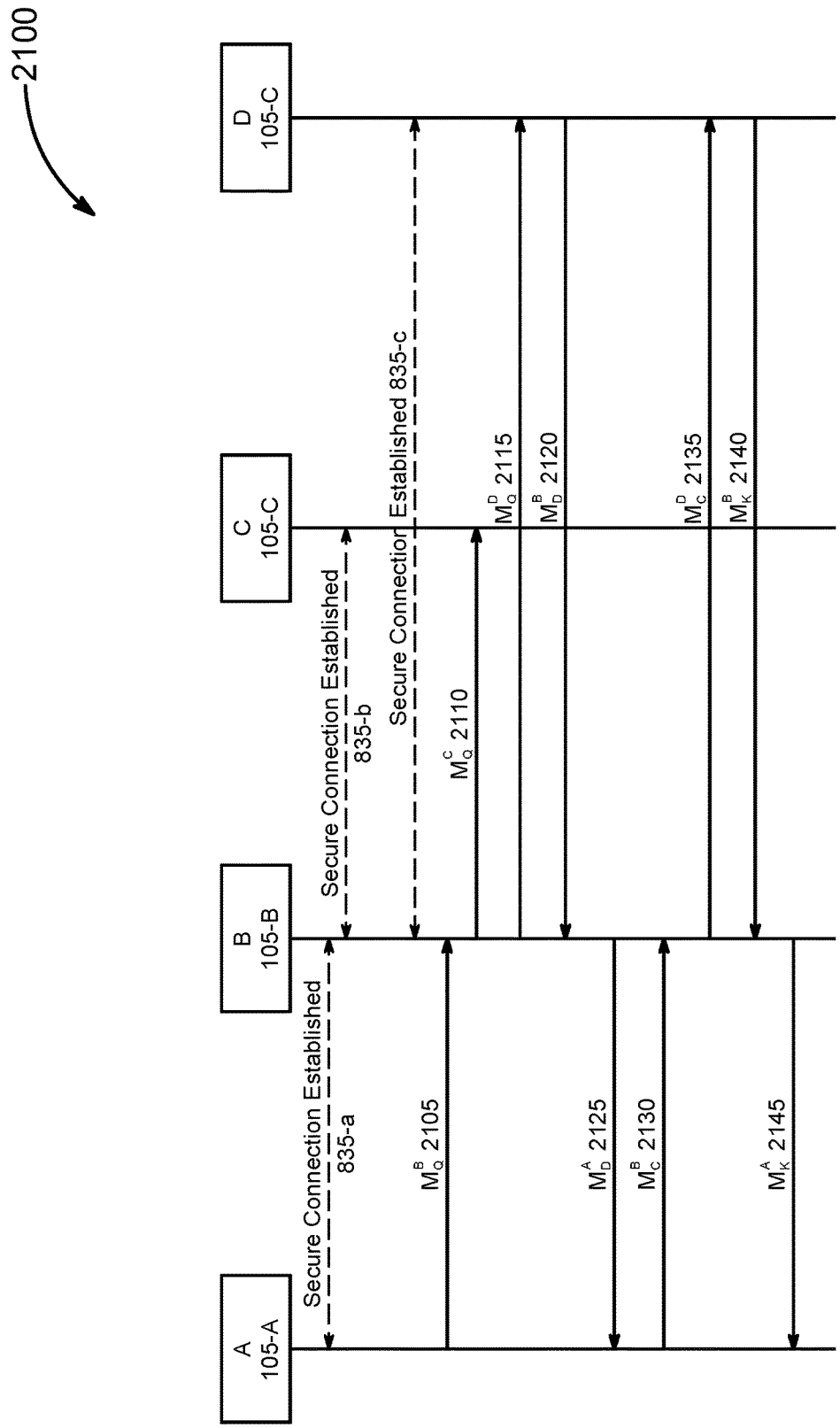
FIG. 21 is a message flow diagram illustrating how the described systems and methods may be used in practice.

FIG. 21 is a message flow diagram 2100 illustrating how the described systems and methods may be used in practice. Node A 105-A and node B 105-B are connected via an established secure connection 835-a, node B 105-B and node C 105-C are connected via an established secure connection 835-b, and node B 105-B and node D 105-D are connected via an established secure connection 835-c as described with respect to FIGS. 11 and 12, for example.

As used in this example, $T_N$ represents a static token generated by node N, $T^K_{NM}$ represents a ratcheting token of a cryptographically secure random number sequence generated by nodes N and M, with K representing the $K^{th}$ token (e.g., token state) in the sequence, $P_i$ representing port i of the node, and $G_N$ representing the UUID of node N.

In one example, App20 in node A 105-A ($P_A^{20}$) seeks a persistent connection with App20 somewhere else in the network. It is assumed that App20 is only running on node A 105-A and node D 105-D in this example. $P_A^{20}$ will query the network for other running instances of $P^{20}$. It is presumed that the token secured routing protocol is represented by $Q(P^{20})=Q$. It is also presumed that the $T^N{\rightarrow}^r{\rightarrow}T^{N+1}$ notation denotes ratcheting the secure token forward.

Node A 105-A prepares packet $T^0_{AB}+Q=M^B_Q$ and registers an inbound routing entry ($T^1_{AB}$, *). Node A 105-A sends packet $M^B_Q$ 2105 and ratchets the secure token $T^0_{AB}{\rightarrow}^r{\rightarrow}T^1_{AB}$. Node B 105-B receives $M^B_Q$ 2105 and identifies token $T^0_{AB}$ with rule *. The message protocol handler of node B 105-B parses Q. Node B 105-B ratchets the secure token $T^0_{AB}{\rightarrow}^r{\rightarrow}T^1_{AB}$ and registers an outbound routing entry ($T^1_{AB}$, $P_1$). Node B 105-B does not have App20 so does not respond to node A 105-A.

Node B 105-B prepares packet $T^0_{BC}+Q=M^C_Q$ and registers an inbound routing entry ($T^1_{BC}$, $T^1_{AB}$). Node B 105-B prepares packet $T^0_{BD}+Q=M^D_Q$ and registers an inbound routing entry ($T^1_{BD}$, $T^1_{AB}$). Node B 105-B sends packet $M^C_Q$ 2110 and ratchets the secure token $T^0_{BC}{\rightarrow}^r{\rightarrow}T^1_{BC}$. Node B 105-B sends packet $M^D_Q$ 2115 and ratchets the secure token $T^0_{BD}{\rightarrow}^r{\rightarrow}T^1_{BD}$.

Node C 105-C receives $M^C_Q$ 2110 and processes the packet as described above. Node C 105-C ratchets the secure token $T^0_{BC}{\rightarrow}^r{\rightarrow}T^1_{BC}$. Node C 105-C does not have App20, so does not respond to node A 105-A. Node C 105-C does not have any child nodes, node C 105-C does not forward Q.

Node D 105-D receives $M^D_Q$ 2115 and processes the packet as described above. Node D 105-D ratchets the secure token $T^0_{BD}{\rightarrow}^r{\rightarrow}T^1_{BD}$. Node D 105-D does have App20, so prepares message Disclose($P^{20}$)=D. Node D 105-D sends packet $M^B_D$ 2120=$T^1_{BD}$+D.

Node B 105-B receives $M^B_D$ 2120 and identifies $T^1_{BD}$ in the inbound routing table. Based on the routing rules ($T^1_{BD}$, $T^1_{AB}$) and ($T^1_{AB}$, $P_1$) set above, node B 105-B prepares message $M^A_D$ 2125=$T^1_{AB}$+D.

Node A 105-A receives $M^A_D$ 2125 and identifies $T^1_{AB}$ in the inbound routing table ($T^1_{AB}$, *), where * is the protocol handler. The protocol handler at node A 105-A processes the Disclose($P^{20}$) message. Now $P_A^{20}$ knows where to contact $P_D^{20}$.

As noted above, $P_A^{20}$ seeks a persistent connection with $P_D^{20}$. In order to establish a permanent connection between $P_A^{20}$ and $P_D^{20}$ a dedicated token chain is required from node A 105-A to node B 105-B. The new tokens for the connection are designated by T. It is presumed that the protocol is represented by Connect$_N$($P_D^{20}$)=C, where N is a nonce that must be signed by D for the connection to be valid.

Node A 105-A prepares $T^2_{AB}+C=M^B_C$ and sends $M^B_C$ 2130. Node A 105-A ratchets the secure token $T^2_{AB} \to^r \to T^3_{AB}$ and registers an inbound routing entry ($T^3_{AB}$, *). Node A 105-A initializes $T^0_{AB}$ and packs it into C (e.g., see FIGS. 18 and 19). Node A 105-A registers an inbound routing entry (e.g., rule) of ($T^0_{AB}$, $P_A^{20}$).

Node B 105-B receives $M^B_C$ 2130 and identifies toke $T^2_{AB}$ with existing rule ($T^2_{AB}$, *) in the inbound routing table. The node B 105-B message protocol handler parses C. If permission match from C, node B 105-B registers an outbound routing entry ($T^0_{AB}$, $P_1$). Node B 105-B initializes $T^0_{BD}$ and packs it into C (e.g., see FIGS. 18 and 19). Node B 105-B registers an inbound routing entry (e.g., rule) of ($T^0_{BD}$, $T^0_{AB}$). Node B prepares $T^2_{BD}+C=M^D_C$ and sends $M^D_C$ 2135. Node B 105-B ratchets the secure token $T^2_{BD} \to^r \to T^3_{BD}$. It is noted that having previously identified that $G_D$ is associated with port 3, node B 105-B can ignore preparing and sending $M^C_C$ (not shown).

Node D 105-D receives $M^D_C$ 2135 and identifies token $T^2_{BD}$ with existing rule ($T^2_{BD}$, *) in the inbound routing table. The node D 105-D message protocol handler parses C. If permissions match from C, node D 105-D registers an outbound routing entry ($T^0_{BD}$, $P_1$) and an inbound routing entry ($T^0_{BD}$, $P_D^{20}$). Node D 105-D connects to $P_D^{20}$ and sends an acknowledgment of success (via the return response route as described herein, for example).

It is presumed that the protocol is represented by ConnectOK$_N$=K. Node D 105-D prepares $T^0_{BD}+K=M^B_K$ and sends $M^B_K$ 2140. Node D 105-D ratchets the secure token $T^0_{BD} \to^r \to T^1_{BD}$.

Node B 105-B receives $M^B_K$ 2140 and identifies token $T^0_{BD} \to T^0_{AB} \to P_1$ with existing routing rules in the inbound and outbound routing tables. Node B prepares $T^0_{AB}+K=M^A_K$ and sends $M^A_K$ 2145. Node B 105-B ratchets the secure token $T^0_{AB} \to^r \to T^1_{AB}$ and $T^0_{BD} \to^r \to T^1_{BD}$.

Node A 105-A receives $M^A_K$ 2145 and identifies token $T^0_{AB}$ with existing rule ($T^0_{AB}$, $P_A^{20}$) in the inbound routing table. $P_A^{20}$ receives the message K, meaning the connection request was successful. Now node A 105-A and node D 105-D can communicate on secured channel $T_{AB}$ and $T_{BD}$ respectively.

Figure 22:
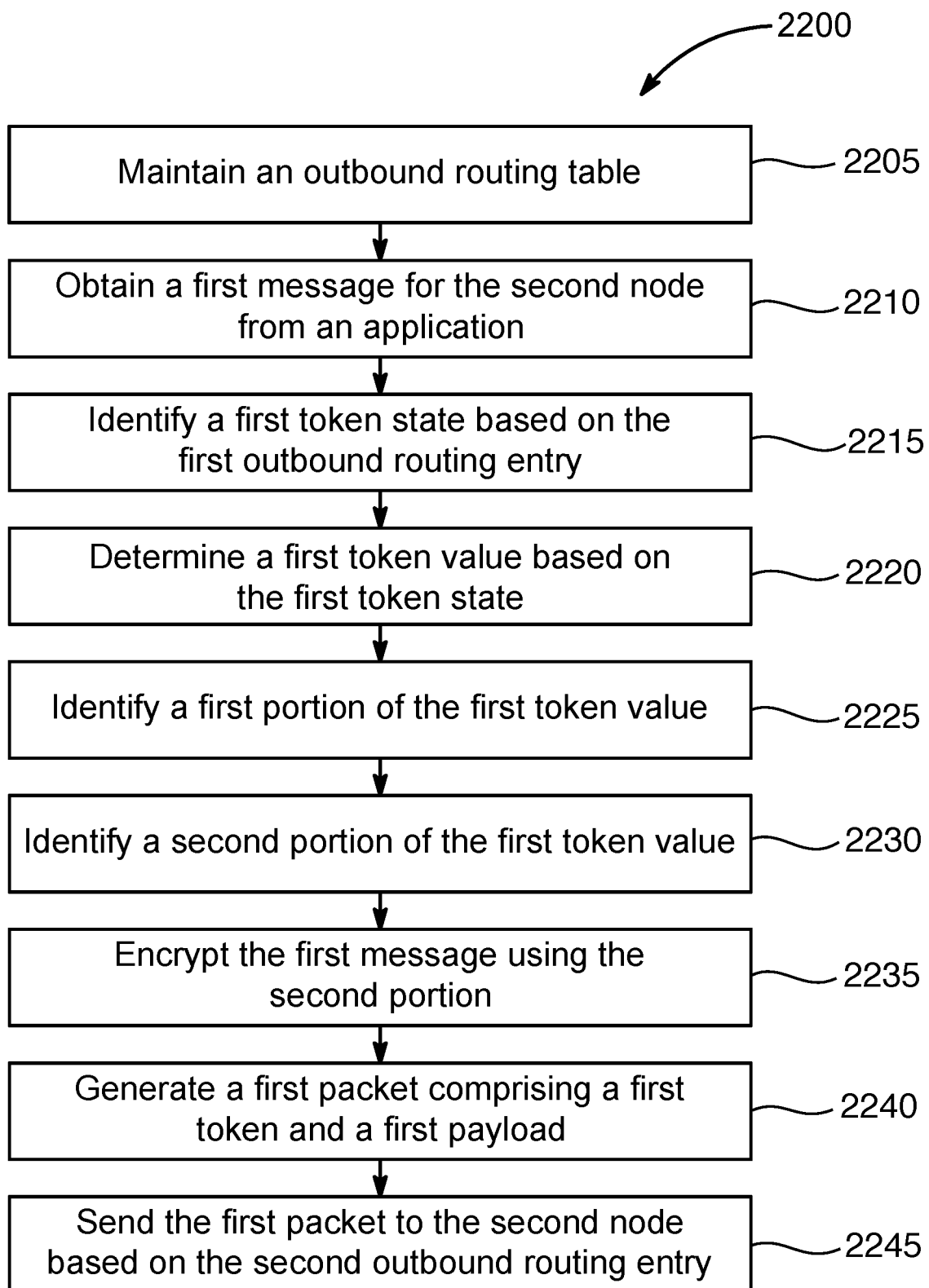
FIG. 22 is a flow diagram illustrating one example of a method for token secured routing.

FIG. 22 is a flow diagram illustrating one example of a method 2200 for token secured routing. The method 2200 may be implemented by a node 105 and more specifically by an application specific processor (e.g., processor and memory 130) included within the node 105.

At 2205, an outbound routing table is maintained. At 2210, a first message for the second node is obtained from an application. At 2215, a first token stat is identified based on the first outbound routing entry. At 2220, a first token value is determined based on the first token state. At 2225, a first portion of the first token value is identified. At 2230, a second portion of the first token value is identified. At 2235, the first message is encrypted using the second portion. At 2240, a first packet is generated, where the first packet includes a first token and a first payload. At 2245, the first packet is sent to the second node based on the second outbound routing entry.

Figure 23:
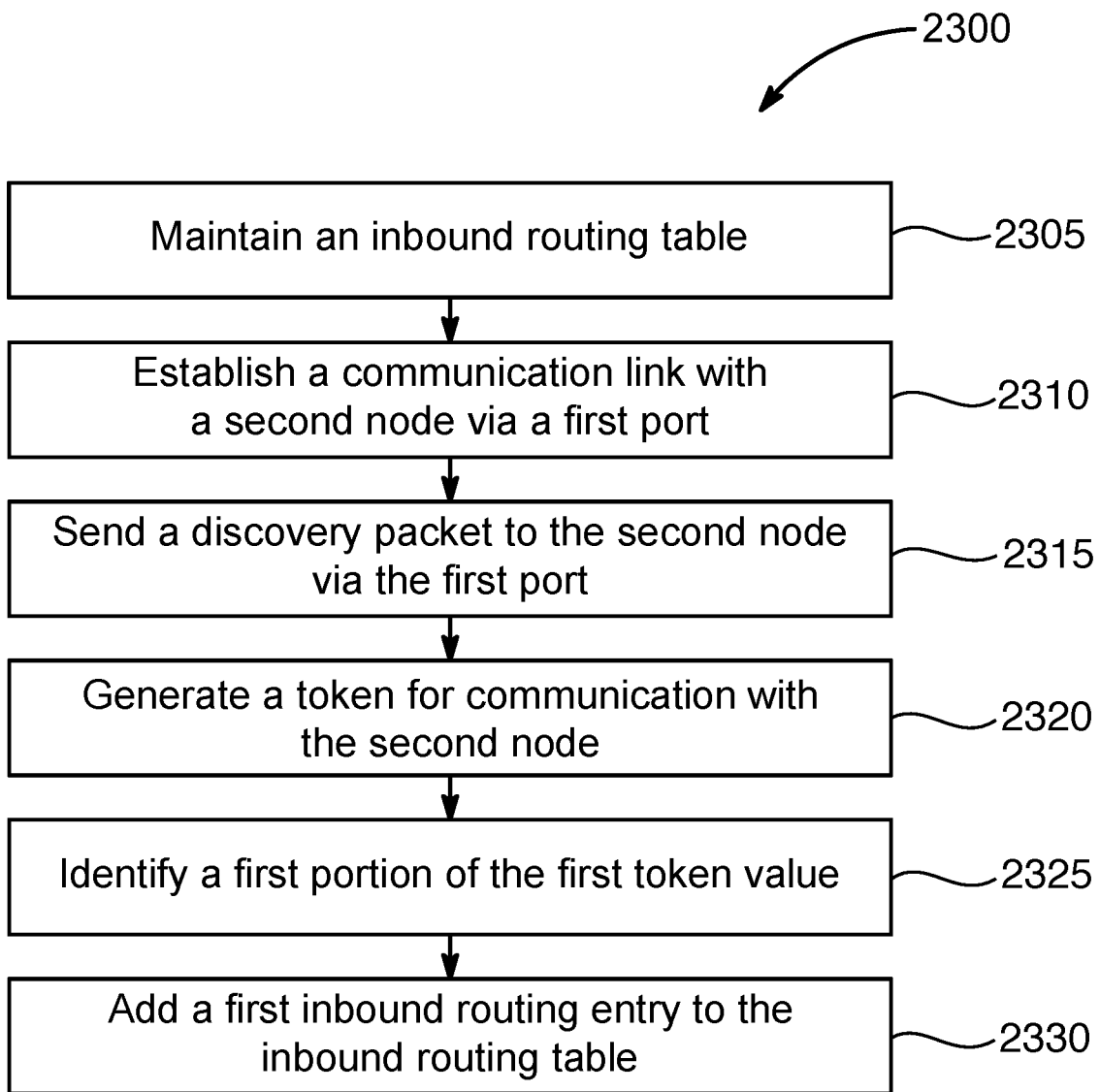
FIG. 23 is a flow diagram illustrating one example of a method for discovering and connecting to nodes.

FIG. 23 is a flow diagram illustrating one example of a method 2300 for discovering and connecting to nodes. The method 2300 may be implemented by a node 105 and more specifically by an application specific processor (e.g., processor and memory 130) included within the node 105.

At 2305, an inbound routing table is maintained. At 2310, a communication link is established with a second node via a first port. At 2315, a discovery packet is sent to the second node via the first port. At 2320, a token is generated for communication with the second node. At 2325, a first portion of the first token value is identified. At 2330, a first inbound routing entry is added to the inbound routing table.

Figure 24:
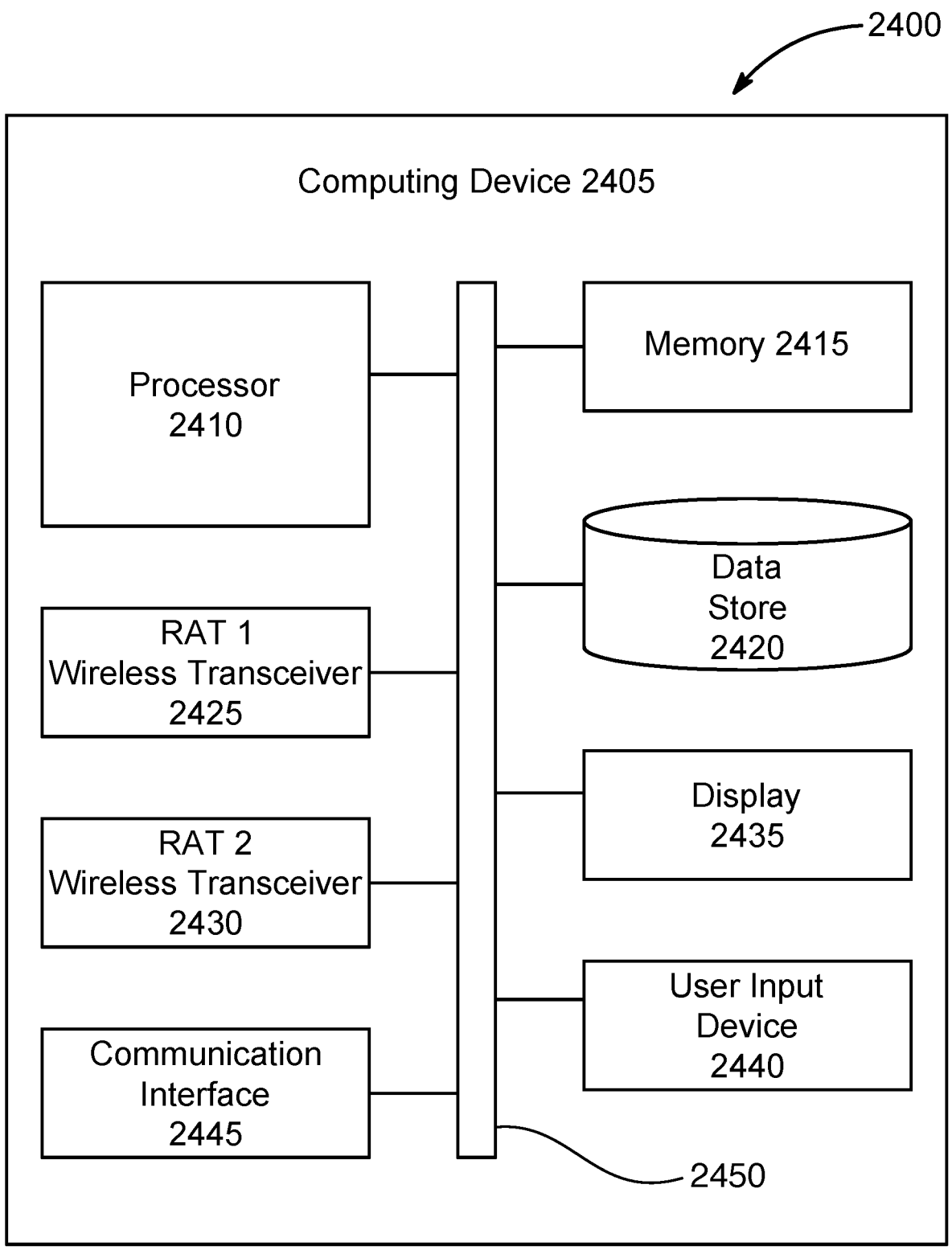
FIG. 24 is a block diagram of a computing device for implementing the described systems and methods.

FIG. 24 is a block diagram of a computing device 2405 for implementing the described systems and methods. In some embodiments, the nodes (e.g., nodes 105) may be examples of the computing device 2405.

The computing device 2405 includes a processor 2410 (including a general-purpose processor and one or more application specific processors, for example), a wireless transceiver 2425 for communicating via a first RAT (e.g., 3G, 4G, LTE, 5G-NR, and/or LoRaWAN), an optional wireless transceiver 2430 for communicating via a second RAT (e.g., Bluetooth, Wi-Fi), a communication interface 2445 (e.g., serial interface, peripheral component interconnect express), a memory 2415 (e.g., random access memory (RAM), non-volatile RAM (NVRAM)), data store 2420 (e.g., hard disk drive, solid state disk), an optional display 2435 for interfacing with a user, a user input device 2440 (e.g., touch input, mouse, keyboard, pen input), and an interconnect or bus 2450 for interconnecting each of the components 2410-2440.

In some embodiments, the memory 2415 and/or the data store 2420 (each being a non-transitory storage medium, for example) may store instructions that are executable by the processor 2410 (e.g., processor and memory 130) to implement the systems and methods described herein. For example, the instructions may be executable by the processor 2410 to implement any of the methods (e.g., method 2200 and/or method 2300).

In some embodiments, each node 105 has a globally unique identifier that may be used by external devices to reference the node, each node probes each available input output (IO) port for connected nearest-neighbor nodes, each node autonomously negotiates with nearest-neighbor nodes connected through one or more IO ports (wired, or wireless), each node automatically communicates system state and network information with nearest neighbors, each node enters into one of the following states of operation: INIT, IDLE, RUN, DIAGNOSIS, ERROR, each node maintains an internal clock (e.g., 64 bit epoch time in microseconds), each node provides at least 100 nanosecond time synchronization negotiation with all input node devices, each node automatically discovers external node data transfer configurations, each node configures a port manager (including IO buffers) for each connected device, each node negotiates a minimal communication schedule with each connected node, and each node negotiates persistent future token protocols.

The following is an example of the steps involved in bringing up a local sensor network and does not necessarily reflect implementation details or performance optimizations. A node is powered up or connected with a new node. A node has at least two communication ports. At least one port (Port 0) defaults to an output role. At least one port defaults to an input role. A node enters the INIT state and performs internal initialization operations. The node initializes platform network level firewall rules and begins to monitor network traffic on Port0. The node responds to platform level network requests on Port0 (e.g. status requests).

A node enters the IDLE state and waits for further explicit instructions. The node responds to platform level network requests on the input ports. Optionally, the node automatically advances to the RUN state.

A node enters the RUN state and polls all output ports looking for connected devices. The node establishes a data transfer link with connected devices and requests public identification data (via the platform protocol). Optionally the node authenticates identification from third party upstream. The node negotiates and selects token and encryption encapsulation protocols. Optionally, the node negotiates and selects internal access privileges.

The invention has been described with reference to various specific and preferred embodiments and techniques. Nevertheless, it is understood that many variations and modifications may be made while remaining within the spirit and scope of the invention.

What is claimed is:

1. A method for communication by a first node, comprising:
   maintaining an inbound routing table;
   maintaining an outbound routing table;
   establishing a communication link with a second node via a first port;
   sending a discovery packet to the second node via the first port, wherein the discovery packet comprises a discovery token value;
   receiving a key exchange request from the second node;
   negotiating an encryption key with the second node;
   generating a first token for communication with the second node, wherein the first token is generated based on the encryption key, and wherein the first token comprises a first token value;
   identifying a first portion of the first token value, wherein the first portion of the first token value comprises a first token state of the first token;
   adding a first inbound routing entry to the inbound routing table, wherein the first inbound routing entry sets the second node to the first token state;
   adding a first outbound routing entry to the outbound routing table, wherein the first outbound routing entry sets the second node to the first token state;
   obtaining a first message for the second node;
   identifying the first token state based on the first outbound routing entry;
   identifying a second portion of the first token value based on the first token state;
   encrypting the first message using the second portion of the first token value; and
   generating a first packet comprising the first token state and a first payload, wherein the first payload is the encrypted first message.

2. The method of claim 1, further comprising:
   negotiating a session nonce with the second node; and
   negotiating a position offset bit value with the second node, wherein the first token is generated based on the encryption key, the session nonce, and the position offset bit value, and wherein the first token is cryptographically secured using the encryption key.

3. The method of claim 1, further comprising:
   adding a second outbound routing entry to the outbound routing table, wherein the second outbound routing entry maps the first token state to the first port.

4. The method of claim 3, further comprising:
   sending the first packet to the second node based on the second outbound routing entry.

5. The method of claim 1, wherein the first token comprises a deterministic random number, wherein the first token has a plurality of token states, wherein each token state corresponds to a unique portion of the first token value, and wherein each token state has a unique value.

6. The method of claim 5, wherein the token state of the first token changes with each communication, wherein the token state ratchets with each communication according to a ratcheting algorithm.

7. The method of claim 5, further comprising:
   establishing a secure channel with the second node using the first token.

8. The method of claim 7, wherein the secure channel is maintained based at least in part on the token state of the first node being synchronized with a token state of the second node.

9. The method of claim 7, further comprising:
   generating a new token state for each communication via the secure channel.

10. The method of claim 1, wherein the communication link is one of a hardware link or a wireless link.

11. A method for communication by a first node, comprising:
    maintaining an inbound routing table;
    maintaining an outbound routing table;
    establishing a communication link with a second node via a first port;
    receiving a discovery packet from the second node via the first port, wherein the discovery packet comprises a discovery token value;
    sending a key exchange request from the second node;
    negotiating an encryption key with the second node;
    generating a first token for communication with the second node, wherein the first token comprises a first token value;
    identifying a first portion of the first token value, wherein the first portion of the first token value comprises a first token state of the first token;
    adding a first inbound routing entry to the inbound routing table, wherein the first inbound routing entry sets the second node to the first token state;
    adding a first outbound routing entry to the outbound routing table, wherein the first outbound routing entry sets the second node to the first token state;
    obtaining a first message for the second node;
    identifying the first token state based on the first outbound routing entry;
    identifying a second portion of the first token value based on the first token state;
    encrypting the first message using the second portion of the first token value;
    generating a first packet comprising the first token state and a first payload, wherein the first payload is the encrypted first message.

12. The method of claim 11, further comprising:
    negotiating a session nonce with the second node; and
    negotiating a position offset bit value with the second node, wherein the first token is generated based on the encryption key, the session nonce, and the position offset bit value, and wherein the first token is cryptographically secured using the encryption key.

13. The method of claim 11, further comprising:
    adding a second outbound routing entry to the outbound routing table, wherein the second outbound routing entry maps the first token state to the first port.

14. The method of claim 3, further comprising:
    sending the first packet to the second node based on the second outbound routing entry.

15. The method of claim 11, wherein the first token comprises a deterministic random number, wherein the first token has a plurality of token states, wherein each token state corresponds to a unique portion of the first token value, and wherein each token state has a unique value.

16. The method of claim 15, wherein the token state of the first token changes with each communication, wherein the token state ratchets with each communication according to a ratcheting algorithm.

17. The method of claim 15, further comprising:
establishing a secure channel with the second node using the first token.

18. The method of claim 17, wherein the secure channel is maintained based at least in part on the token state of the first node being synchronized with a token state of the second node.

19. The method of claim 17, further comprising:
generating a new token state for each communication via the secure channel.

20. The method of claim 11, wherein the communication link is one of a hardware link or a wireless link.

* * * * *